United States Patent [19]

Tanaka et al.

[11] Patent Number: 5,260,683
[45] Date of Patent: Nov. 9, 1993

[54] TIRE PRESSURE DETECTING APPARATUS FOR VEHICLE

[75] Inventors: Akio Tanaka, Toyohashi; Masaru Suzuki; Hideki Miyazawa, both of Kariya; Kazuma Matsui, Toyohashi; Tetsuya Nagata, Kounan; Yutaka Ohasi, Handa; Yoshihisa Nakano, Nagoya, all of Japan

[73] Assignee: Nippondenso Co., Ltd., Kariya, Japan

[21] Appl. No.: 680,667

[22] Filed: Apr. 5, 1991

[30] Foreign Application Priority Data

Apr. 5, 1990 [JP] Japan ................... 2-90966
Feb. 5, 1991 [JP] Japan ................... 3-014183

[51] Int. Cl.5 ............................ B60C 23/00
[52] U.S. Cl. ................... 340/448; 340/444; 340/445; 340/449; 73/146.5; 116/34 R; 200/61.22
[58] Field of Search ............ 340/448, 445, 442, 444, 340/449; 73/146.4, 146.5; 116/34 R; 200/61.22

[56] References Cited

U.S. PATENT DOCUMENTS

| 3,858,174 | 12/1974 | Harris | 340/448 |
|---|---|---|---|
| 3,881,170 | 4/1975 | Hosaka et al. | 340/448 |
| 3,911,434 | 10/1975 | Cook | 340/447 |
| 4,057,783 | 11/1977 | Blanchier | 340/448 |
| 4,450,431 | 5/1984 | Hochstein | 340/447 |
| 4,567,459 | 1/1986 | Folger | 340/58 |
| 5,006,844 | 4/1991 | Ohta et al. | 340/448 |

FOREIGN PATENT DOCUMENTS

| 2493775 | 5/1982 | France | 340/448 |
|---|---|---|---|
| 54-124771 | 9/1979 | Japan. | |
| 60-80327 | 6/1985 | Japan. | |
| 61-141098 | 6/1986 | Japan. | |
| 63-501065 | 4/1988 | Japan. | |
| 63-501066 | 4/1988 | Japan. | |
| 0306905 | 12/1988 | Japan | 340/442 |

OTHER PUBLICATIONS

Automotive Electronic News, "BMW Chooses Michelin Tire Pressure Monitor".
An Advertisement by Michelin "M. T. M. Elektronische Luftdruck-Uberwachung".
Jidokagijutsu, vol. 14, "Pressure Sensor Utilizing Piezo Ceramic".

Primary Examiner—John K. Peng
Assistant Examiner—Nina Tong
Attorney, Agent, or Firm—Cushman, Darby & Cushman

[57] ABSTRACT

A tire pressure detecting portion includes a housing, provided within the tire, within which a piezoelectric element is provided so as to be deformed by the tire pressure. The capacitance of said piezoelectric element is changed in accordance with its deformation. The piezoelectric element is electrically connected with a first coil diposed within said tire. The first coil is electromagnetically coupled with an excitation coil and a receiving coil, both of which are provided in the vehicle. The excitation coil provides an excitation voltage whole frequency is changed within a predetermined range including a resonant frequency. When the received voltage has the resonant frequency, a correspondinq tire pressure is determined based on a data map showing the relationship between said resonant frequency and the tire pressure.

28 Claims, 36 Drawing Sheets

TIRE PRESSURE DETECTING APPARATUS FOR VEHICLE

FIELD OF THE INVENTION

The present invention relates to an apparatus for detecting tire pressure.

BACKGROUND OF THE INVENTION

There are three types of conventional apparatus for detecting a tire pressure.

The first type of apparatus, which is disclosed for example in the U.S. Pat. No. 4,567,459, includes a pressure detecting circuit which is mounted in the tire for generating an electrical signal indicative of the tire pressure.

The pressure detecting circuit is comprised of various electronic devices for frequency modulating the generated electrical signal. The modulated electrical signal is transferred to the vehicle body by electromagnetic coupling.

The second type is disclosed in page 15 of AUTOMOTIVE ELECTRONIC NEWS which was published on Jun. 26, 1989. This second type discloses a pressure detecting circuit for detecting the tire pressure mounted in the tire. The pressure detecting circuit includes a radio transmitting circuit for transmitting the detected signal to the body of the vehicle.

The third type is disclosed in Toku-Kai-Sho 61-141098 (Japanese laid open patent application). The apparatus includes a semiconductor pressure sensor and an LC resonant circuit both of which are mounted in the tire. The resistance of the semiconductor pressure sensor is changed according to the tire pressure. Since the Q value of the LC resonant circuit is changed in accordance with the resistance of the semiconductor sensor, the tire pressure is detected by detecting the Q value.

However, the above described conventional apparatus have problems of durability because the electronic devices or the circuit elements are mounted in the tire and therefore exposed to very severe conditions of high temperature and high vibration. Their characteristics are easily changed and deteriorated under such a condition. For example, the resistance of the semiconductor pressure sensor, and hence the Q value of the RLC resonant circuit disclosed in the above Toku-Kai-Sho 61-141,098 is easily changed by the tire temperature. In addition, these devices have an accuracy problem due to the relative difficulty of determining the Q value and due to the temperature dependence of the resistor.

SUMMARY OF THE INVENTION

An object of the present invention is to provide a tire pressure detecting apparatus which is capable of properly detecting a tire pressure under severe conditions.

For the purpose of achieving the above object, the invention comprises the following elements: namely, pressure-impedance transforming means, provided within a tire, for transforming a change in the tire pressure into an electrostatic capacitance indicative of the change in pressure;

resonant signal producing means, electrically connected with the pressure-impedance transforming means within the tire, for producing a resonant electric signal having a resonant frequency in accordance with the capacity change generated from the pressure-impedance transforming means;

voltage supplying means, provided in the vehicle, for supplying the resonant signal producing means with an alternating voltage whose frequency is changed within a predetermined range including the resonant frequency;

resonant signal receiving means, provided in the vehicle, for receiving the resonant electric signal produced from the resonant signal producing means; and pressure detecting means, provided in the vehicle, for detecting the tire pressure based on the received resonant electric signal.

According to the present invention, other structure can be provided as follows: namely, first transforming means, provided within the tire, for transforming a change in tire pressure into a capacitance change;

second pressure-capacity transforming means, provided within the tire, for transforming a tire pressure temperature into a capacity change;

first resonant signal producing means, electrically connected with the first pressure-capacity transforming means within the tire, for producing a first resonant electric signal having a first resonant frequency in accordance with the capacity change generated from the first pressure-capacity transforming means;

second resonant signal producing means, electrically connected with the second pressure-capacity transforming means within the tire, for producing a second resonant electric signal having a second resonant frequency in accordance with the capacity change generated from the second pressure-capacity transforming means;

first voltage supplying means, provided in the vehicle, for supplying the first resonant signal producing means with alternating voltage having at least the first resonant frequency;

second voltage supplying means, provided in the vehicle, for supplying the second resonant signal producing means with alternating voltage having at least the second resonant frequency;

first resonant signal receiving means, provided in the vehicle, for receiving the first resonant electric signal produced from the first resonant signal producing means;

second resonant signal receiving means, provided in the vehicle, for receiving the second resonant electric signal produced from the second resonant signal producing means;

pressure detecting means, provided in the vehicle, for detecting the tire pressure based on the first received resonant electric signal; and temperature detecting means, provided in the vehicle, for detecting the tire temperature based on the second received resonant electric signal.

According to this first-described structure of the present invention, the tire pressure change is transformed to the electrostatic capacitance change by the pressure-imedance transforming means. This capacitance change is transformed to the resonant electric signal having the resonant frequency by the resonant signal producing means. In this case, a resonant circuit is formed by only the pressure-impedance means or a combination of pressure-impedance means and the resonant signal producing means. So, the electric circuit within the tire can be very simple and durable. As a result, the tire pressure is detected by detecting the resonant frequency without using a semiconductor sensor or complex electronic circuit which is not resistant to the severe condition within the tire. Therefore, the resonant frequency is stably detected regardless of such a severe condition according to the present invention.

According to the second-described structure of the present invention, the tire pressure can be compensated in accordance with the corresponding tire temperature because the tire pressure and the corresponding tire temperature are simultaneously detected by using the first and second resonant frequencies.

BRIEF DESCRIPTION OF THE DRAWINGS

These and other aspects of the present invention will now be described in detail with reference to the accompanying drawings, wherein.

DETAILED DESCRIPTION OF THE PREFERRED EMBODIMENTS

Hereinafter, the preferred embodiments are explained below with reference to the figures.

First Embodiment

Figure 1:
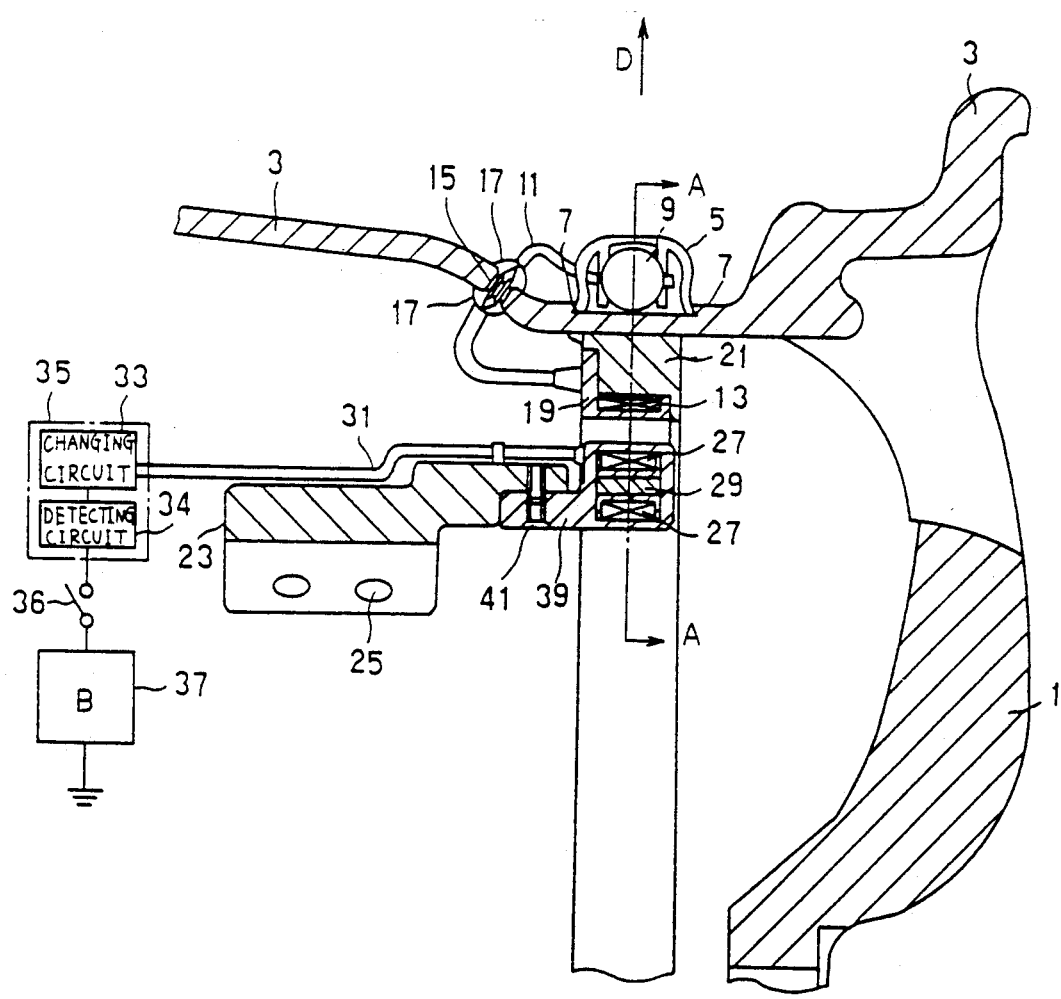
FIG. 1 is a sectional view showing a whole structure of a first embodiment according to the present invention.
Figure 3:
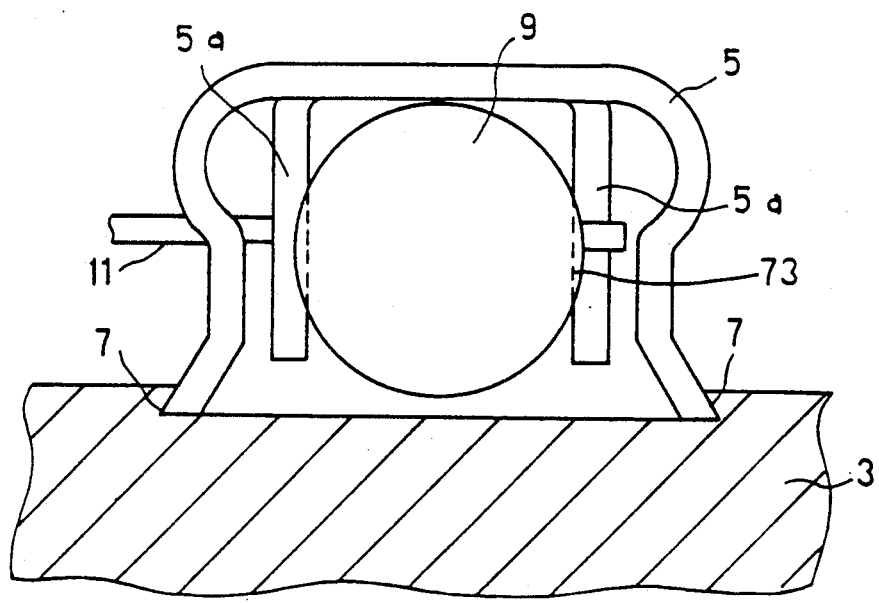
FIG. 3 is a schematic view showing a fixing condition of a pressure detecting portion of the first embodiment.
Figure 4:
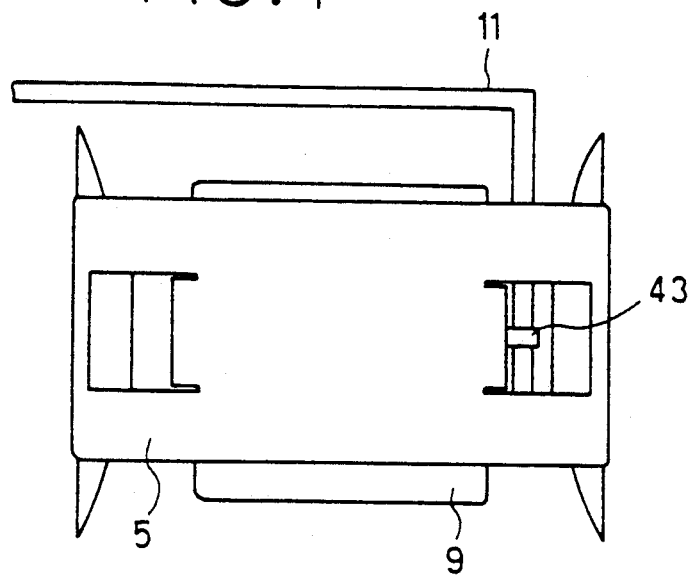
FIG. 4 is a plan view of the pressure detecting portion shown in FIG. 3.

In FIG. 1, a reference numeral 1 designates a wheel to which a rim 3 of a tire is connected. Reference numeral 5 designates a case which is made of an elastic material such as beryllium copper. Both ends of the case 5 are fixed in a cutting portion 7 of the rim 3 by the elasticity of the case 5, or by other fixing means such as welding or adhesive. A pressure detecting portion 9 is provided within the case 5 in a way such that the pressure detecting portion 9 does not touch the rim 3. FIG. 3 shows this in detail, in which the pressure detecting portion 9 is supported in a space within the case 5 by a pair of bent portions 5a which are integrally formed with the case 5 and then bent inwardly. The elasticity of bent portions 5a hold cut portions 73 of the pressure detecting portion 9. Both input and output terminals of the pressure detecting portion 9 are electrically connected through a lead wire 11 and a connecting member 15 to a first coil 13. The lead wire 11 is supported near pressure detecting member 9 by a harness member 43 as shown in FIG. 4. The connecting member 15 comprises a pair of wires, which are connected with the lead wire 11, and an insulating member such as glass which covers the pair of wires. The connecting member 15 is fixed to the rim 3 with a rubber member 17 so that the connecting portion between the lead wire 11 and the connecting member 15 is sealed by the rubber member 17.

The first coil 13 is wound on a bobbin 19 which has a section of an L-shape. The bobbin 19 is set on a stay 21 by welding or adhesive, which is coupled to the rim 3. Reference numeral 27 designates a second coil which is wound on an iron core 29 and accommodated within a case 39 which is made of nonmagnetic material such as aluminum. The case 39 is connected to a stay 23 by a bolt 41. The stay is fixed to a vehicle body, which is not shown in the drawings, by using fixing holes 25 and bolts. According to the above described structure, the second coil 27 faces the first coil 13 as shown in FIG. 1 so as to obtain an electromagnetic coupling with the first coil 13. The second coil 27 is electrically connected through a lead wire 31 with an electronic control unit (hereinafter called ECU) 35 which includes a frequency change circuit 34 and a resonant frequency detecting circuit 35. The ECU is electrically connected through an accessory-key switch 36 with a battery 37 of the vehicle.

Figure 2:
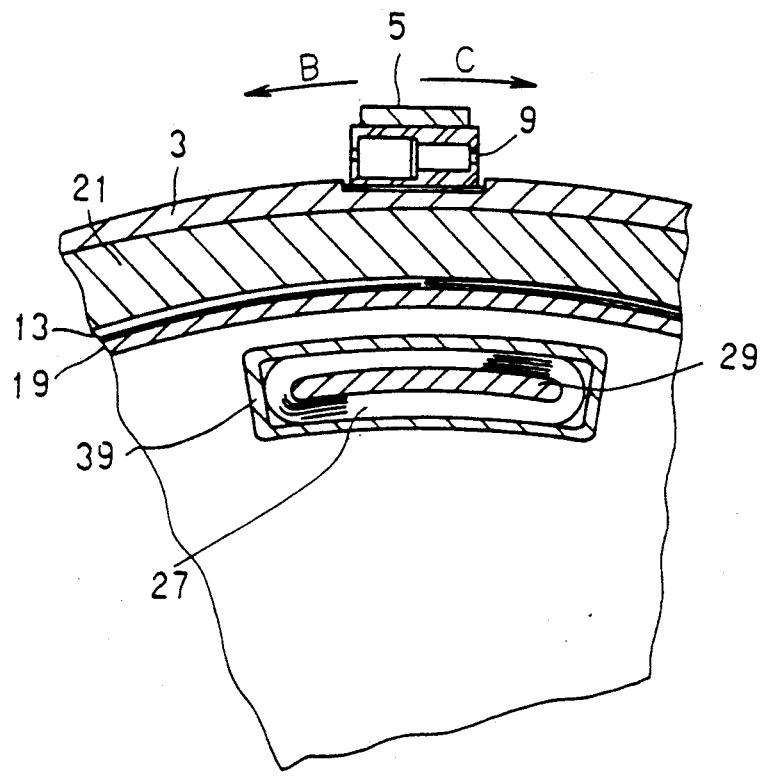
FIG. 2 is a sectional view of a portion shown by A—A line in FIG. 1.

In FIGS. 1 and 2, when the tire having the wheel 1 and the rim 3 rotates in a direction perpendicular to the plane of FIG. 1, namely in a direction shown by an arrow B or C in FIG. 2, a centrifugal force occurs in a direction shown by an arrow D in FIG. 1. In this case, the pressure detecting portion 9 is disposed within the case 5 in an appropriate direction that a pressure detecting surface of the piezoelectric device of the pressure detecting portion is parallel to and therefore not affected by centrifugal force.

Figure 5:
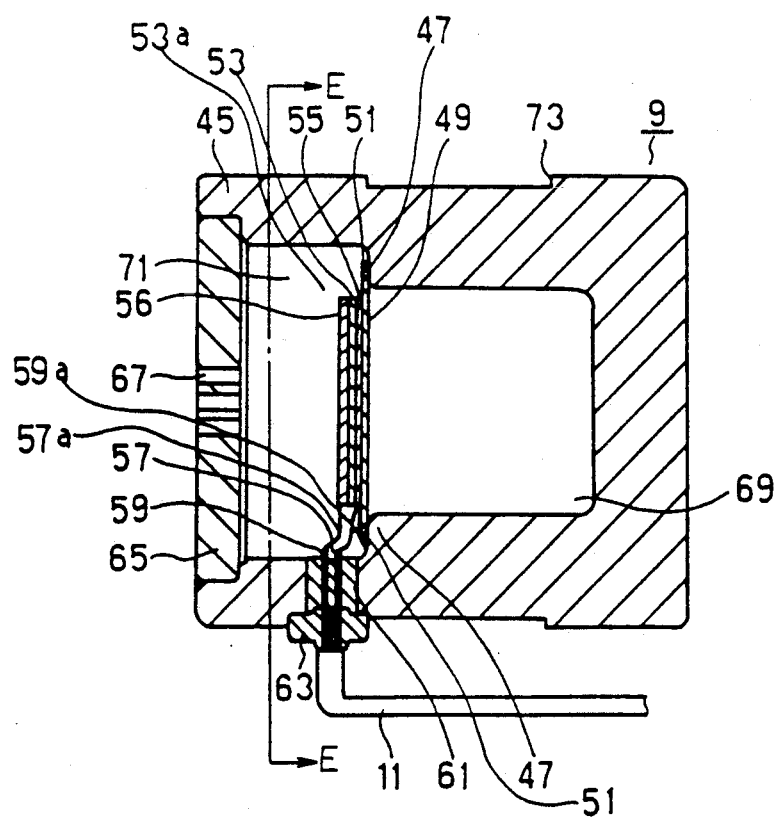
FIG. 5 is a detail sectional view of the pressure detecting portion.
Figure 6:
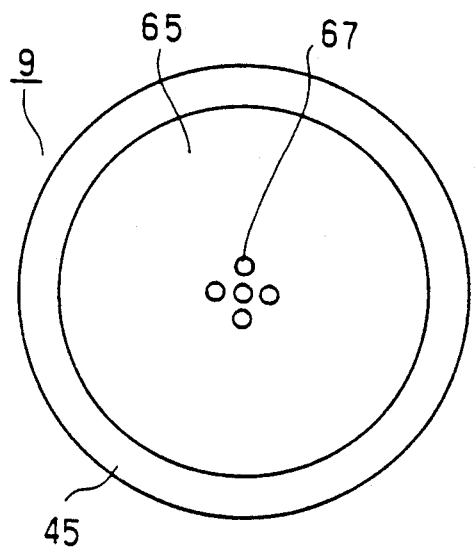
FIG. 6 is a left side view of the pressure detecting portion shown in FIG. 5.
Figure 7:
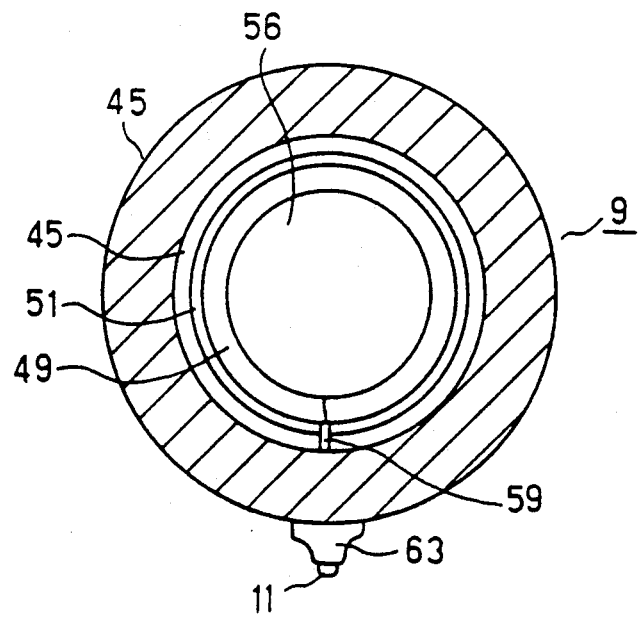
FIG. 7 is a sectional view of a portion shown by E—E line in FIG. 5.

The detailed structure of the pressure detecting portion 9 is explained with reference to FIG. 5 through FIG. 7. FIG. 5 shows the pressure detecting portion 9 comprising a cylindrical housing 45 within which a low pressure chamber 69 and a pressure introducing chamber 71 are formed by a piezoelectric assembly 53a and a circular cap 65. The cylindrical housing 45, which is made of aluminum or stainless steel, has a circular step portion 47 therein. Reference numeral 49 designates a circular diaphragm which is made of an elastic material such as stainless steel. A fixing portion 51 of the diaphragm 49 is fixed to the step portion 47 by welding or adhesive so as to form the low pressure chamber 69 which is pressure tight and maintained at a low pressure, close to vacuum, by engine vacuum or the like (not shown). The diaphragm 49 is adhered to a piezoelectric assembly 53a which includes a circular piezoelectric element 53, which is made of a ceramic material, and a pair of circular electrodes 55 and 56 which are formed on both sides of the piezoelectric element 53 by a heat treatment of silver paste. The thickness of the piezoelectric element 53 is in the range between 0.1 mm through 0.2 mm. Both electrodes 55 and 56 are electrically connected through lead wires 57a and 59a with wires 57 and 59, respectively. Both wires 57 and 59 are inserted in a insulating member 61 and electrically connected with the lead wire 11. The insulating member 61 is fixed to the housing 45 with a rubber seal member 63. The cap 65, which is made of aluminum or stainless steel, is coupled to the housing 45 by welding or adhesive so as to form the pressure introducing chamber 71 between the piezoelectric assembly 53a and the cap 65.

In order to introduce the tire pressure into the pressure introducing chamber 71, a plurality of pressure introducing holes 67 are formed through the cap 65.

Figure 8:
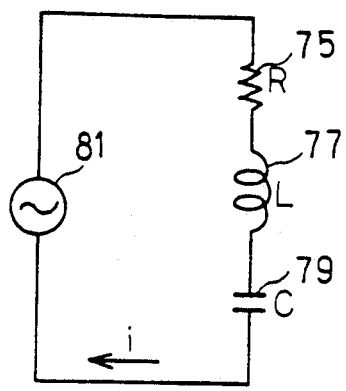
FIG. 8 is an electrical diagram for explaining the operation principle of the first embodiment according to the present invention.
Figure 9:
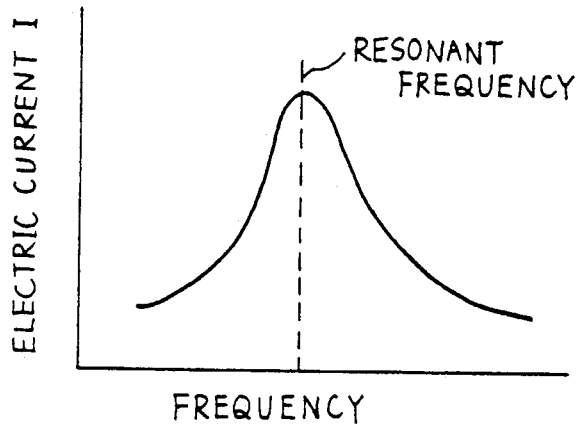
FIG. 9 is a characteristic diagram for explaining the operation principle of the first embodiment according to the present invention.
Figure 10:
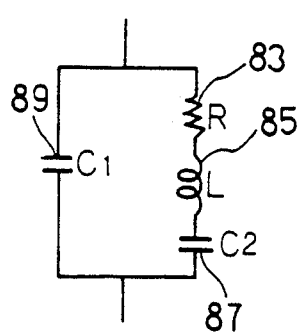
FIG. 10 is an electrical diagram for explaining the operation principle of the first embodiment according to the present invention.
Figure 11:
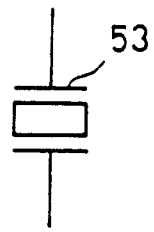
FIG. 11 is an electrical diagram for explaining the operation principle of the first embodiment according to the present invention.
Figure 12:
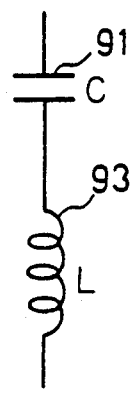
FIG. 12 is an electrical diagram for explaining the operation principle of the first embodiment according to the present invention.
Figure 13:
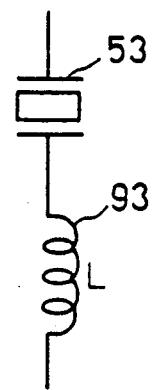
FIG. 13 is an electrical diagram for explaining the operation principle of the first embodiment according to the present invention.

The operation principle is explained with reference to FIGS. 8 through 13. FIG. 8 shows an RLC series resonant circuit in which a resistor 75, a coil 77 and a capacitor 79 are connected in series. If the frequency of the alternating power source 81 of this circuit is changed, the electric current flowing through the circuit is changed in response to the change of the frequency as shown in FIG. 9. Namely, the electric current becomes maximum when the frequency f reaches resonant frequency $f_1$. The similar characteristic shown in FIG. 9 occurs in each circuit illustrated in FIG. 10 through FIG. 13. In FIG. 10, a capacitor is connected in parallel with a RLC series resonant circuit in which a resistor 83, a coil 85 and a capacitor 87 are connected in series. FIG. 11 shows a piezoelectric element 53 which has an equivalent impedance including resistance, inductance and capacitance. Therefore, the piezoelectric element 53 resonates at a resonant frequency which is determined by its impedance, especially its capacitance. In this case, the capacitance of piezoelectric element 53, namely its resonant frequency, is changed in accordance with the change of the tire pressure which is applied to the piezoelectric element 53. Accordingly, the tire pressure is detected by detecting the resonant frequency of the piezoelectric element 53 of a resonant circuit using the piezoelectric element 53. For the purpose of detecting the resonant frequency of the piezoelectric element 53 or the like, a resonant circuit shown in FIG. 13, in which the piezoelectric element 53 is connected with a coil 93, is used according to the first embodiment of the present invention.

Figure 14:
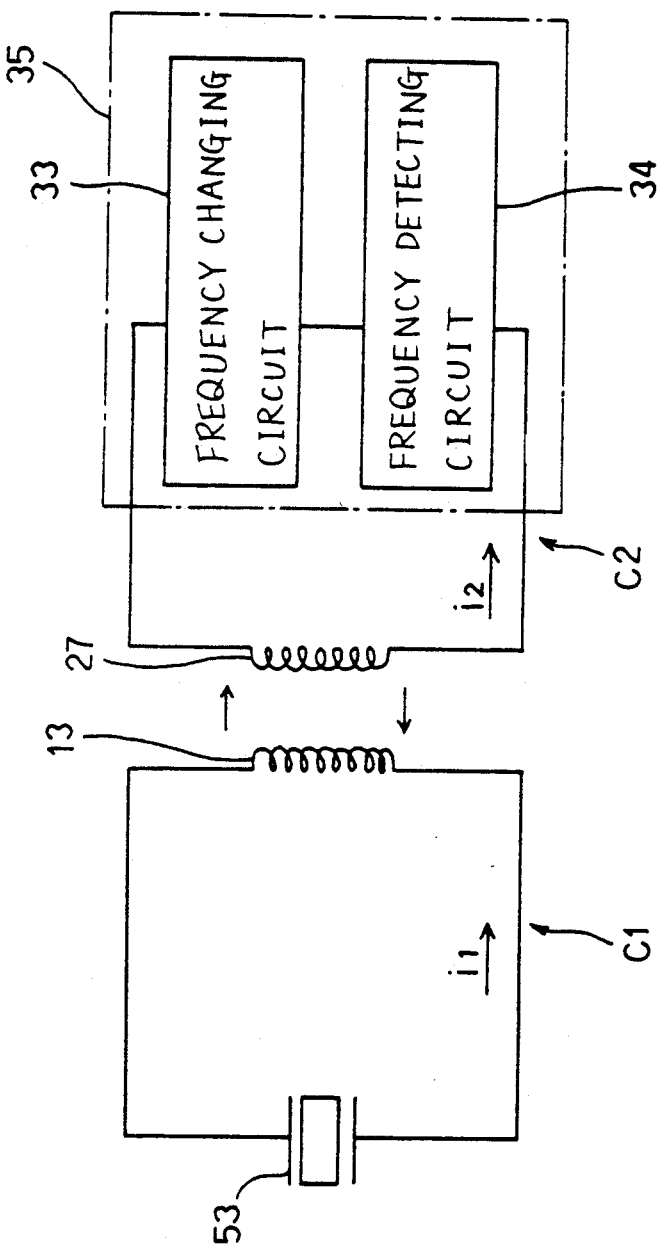
FIG. 14 is a block diagram of the first embodiment of the present invention.

In consideration of the above described principle, the electric circuit of the first embodiment is formed as shown in FIG. 14. The circuit includes two separate circuits. First circuit C1 includes the piezoelectric element 53 and the first coil 13, and is provided in the tire as shown in FIG. 1. The first circuit C1 is electrically equivalent to the resonant circuit shown in FIG. 13. The second circuit C2 includes the second coil 27 and the ECU 35, and is provided in the body of the vehicle. This configuration uses the electromagnetic coupling between the first coil 13 and the second coil 27 shown in FIG. 1. When an alternating voltage is applied to the second coil 27, an alternating voltage is induced in the first circuit C1 by the magnetic coupling.

Figure 15:
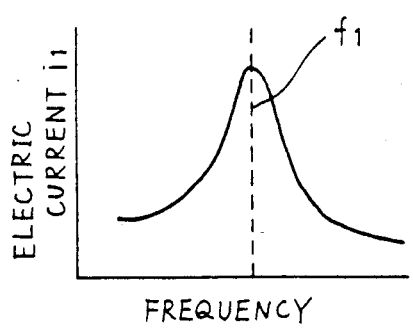
FIG. 15 is a characteristic diagram showing an electric current $i_1$, which is used in the first embodiment according to the present invention.
Figure 16:
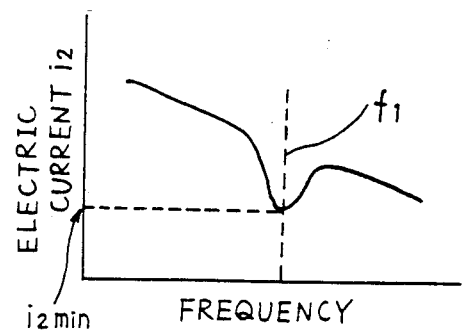
FIG. 16 is a characteristic diagram showing an electric current $i_2$ which is used in the first embodiment according to the present invention.

Accordingly, as the frequency of the alternating voltage is changed by the frequency change circuit 33, the voltage frequency of the first circuit C1 is also changed in a way that the first circuit resonates at a resonant frequency $f_1$ as shown in FIG. 15. The resonant frequency $f_1$ is detected through the first coil 13 and the second coil 27 by the resonant frequency detecting circuit 34. The change of resonant frequency $f_1$ causes the induced current $i_2$ of the second coil 27 to be changed as shown in FIG. 16. As explained above, because the resonant frequency $f_1$ of the first circuit C1 is changed by the change of the tire pressure, the tire pressure can be obtained by detecting the resonant frequency $f_1$.

Figure 17:
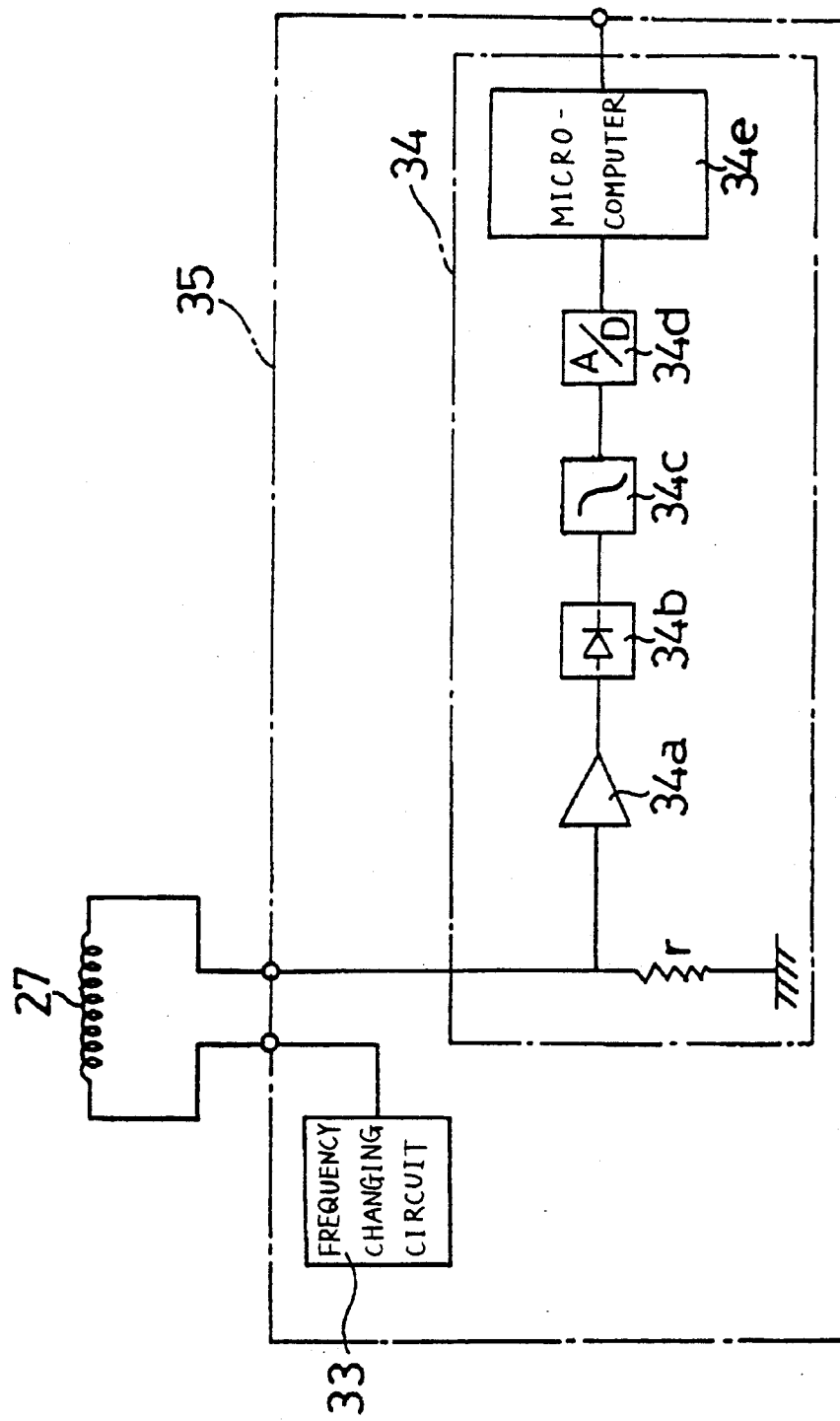
FIG. 17 is a block diagram of an electronic control unit in first embodiment according to the present invention.

FIG. 17 shows the detailed configuration of the ECU 35. The frequency change circuit 33 is a variable frequency oscillator which changes the oscillating frequency within a predetermined range (including the resonant frequency $f_1$) at a predetermined interval. The resonant frequency detecting circuit 34 includes a low resistance r connected to the second coil 27, an amplifier 34a, which has high input impedance for amplifying the voltage drop in the low resistance r, a detector 34b for detecting the output voltage of the amplifier 34a, a smoothing circuit 34c for smoothing the detected voltage, an A-D converter 34d for converting the smoothed direct current voltage into a digital signal and a microcomputer 34e for processing the converted digital signal and then computing a tire pressure. Accordingly, the digital signal is proportional to the average value of the electric current $i_2$ flowing the second coil 27.

In view of the above described configuration, an operation of the first embodiment of the present invention is explained in detail below.

When the accessory key switch of FIG. 1 is turned on by a driver, direct current voltage is supplied to the circuit from the battery so that the frequency change circuit 33 supplies the alternating voltage to the second coil 27. As a result, the induced current occurs in the first circuit C1 by electromagnetic coupling. In the meantime, when the tire pressure is changed the pressure of the pressure introducing chamber 71 is changed through the pressure introducing holes 67. This pressure change causes the diaphragm 49 to be deformed because the pressure of the low pressure chamber 69 maintains a constant pressure. According to the first embodiment, since the pressure of the low pressure chamber 69 is almost a vacuum, it maintains the constant pressure regardless of the temperature change. As a result, the piezoelectric element 53 is deformed so as to change its impedance and especially its capacitance. This impedance change causes a resonant frequency change in the first circuit C1. The resonant frequency change is detected by the resonant frequency detecting circuit 34. The microcomputer 34e determines the tire pressure based on the changed resonant frequency.

Figure 18:
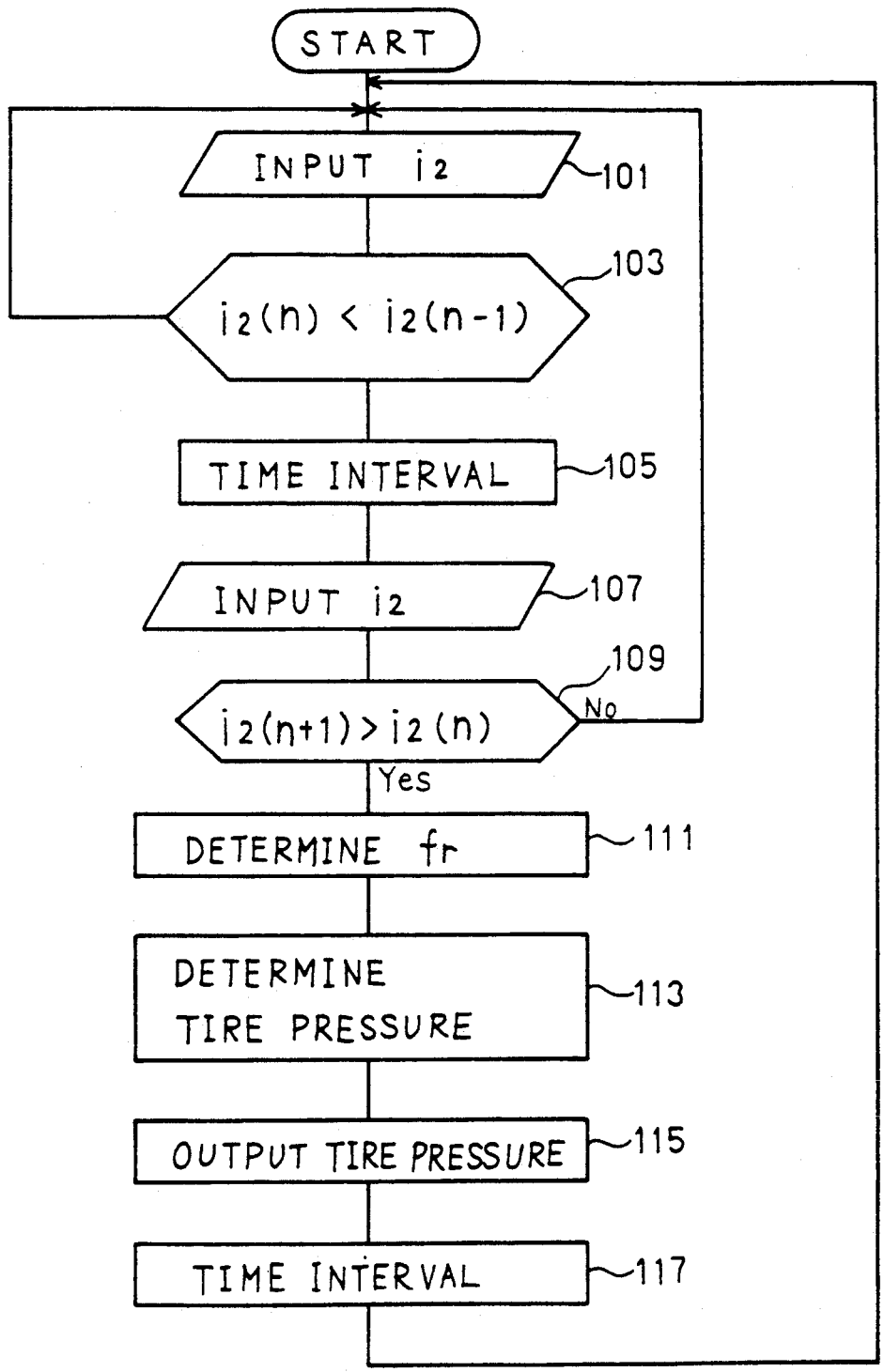
FIG. 18 is a flow chart showing a program carried out by the electronic control unit shown in FIG. 17.

An operation carried out by the microcomputer 34e is shown in FIG. 18. Step 101 shows induced electric current $i_2$ is inputted through the A-D converter 34d. Step 103 is determines whether the input electric current is lower than the previous one in a step 103. If so, after the predetermined interval set in a step 105, the electric current $i_2$ is again input in a step 107. If not, the program returns to the step 101. Then, in a step 108, it is determined whether the electric current $i_2$ input in the step 107 is larger than the electric current $i_2$ input in the step 101. If not, the program returns to the step 101. If so, the electric current $i_2$ input in step 107 is the minimal value $i_2$ shown in FIG. 16.

Then, the program proceeds to a step 111 in which the resonant frequency corresponding to such current is obtained from a first data map. The first data map specifies a relationship between minimal electric current in the second circuit C1 and the resonant frequency corresponding to such a minimal electric current. Then, the tire pressure corresponding to the obtained resonant frequency is obtained from a second data map. The second data map specifies a relationship between the resonant frequency and the tire pressure. Both first data maps and second are calculated in advance for instance by experimentation or as explained with the other embodiments and are stored in ROM in the microcomputer 34e. Then, the obtained tire pressure is outputted from the microcomputer 34e in a step 115. Step 117 is executed when the predetermined interval lapses, and the program then returns to the step 101.

According to the above described first embodiment, the tire pressure can be accurately obtained regardless of severe conditions because the piezoelectric element 53 and the first coil 13, both of which are provided in the tire to form the first circuit C1, have a simple and durable structure to the severe condition such as high temperature.

Second Embodiment

Figure 19:
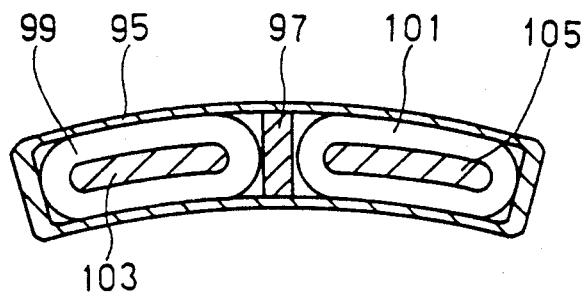
FIG. 19 is a sectional view showing a structure of a second embodiment according to the present invention.
Figure 20:
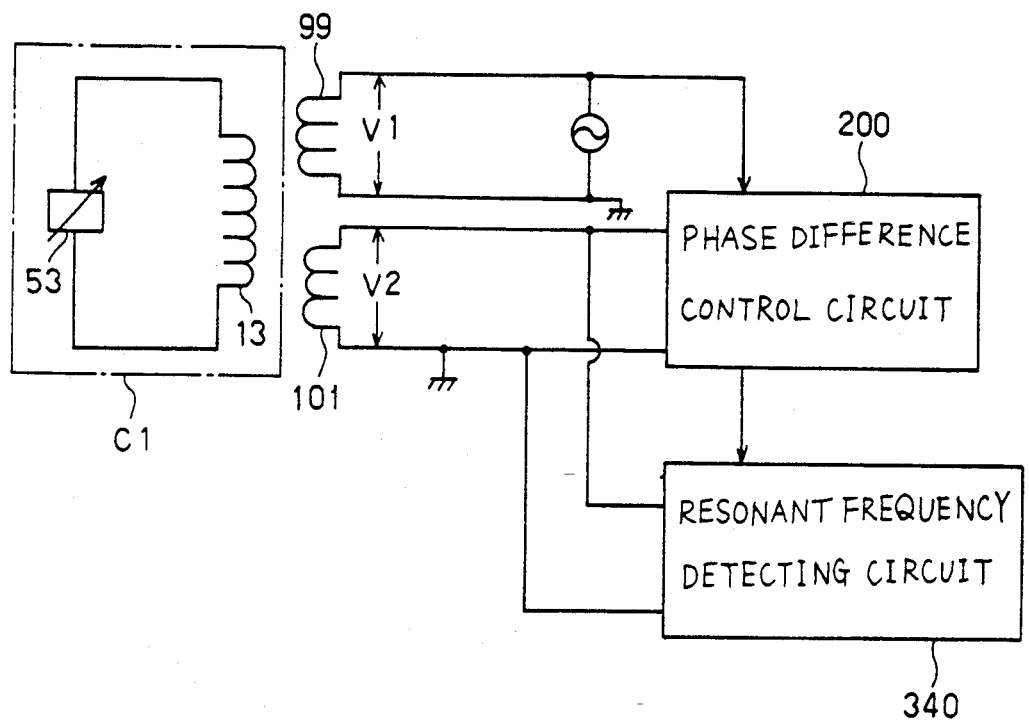
FIG. 20 is an electric diagram of the second embodiment according to the present invention.

A second embodiment of the present invention is explained below with reference to FIG. 19 through FIG. 29. According to the second embodiment, an excitation coil 99 and a receiving coil 101 are provided in the vehicle body for the purpose of obtaining the magnetic coupling with the first coil 13 as shown in FIG. 19 and FIG. 20. FIG. 19 shows the excitation coil 99 and the receiving coil 101 wound with iron cores 103 and 105, respectively, and provided in a case 95 which is made of a nonmagnetic material such as aluminum. Reference numeral 97 designates a separator made of a magnetic material.

FIG. 20 shows the connection of the excitation coil 99 as electrically connected with the frequency change circuit 33. The receiving coil 101 is electrically connected with the resonant frequency detecting circuit 340. In addition to the resonant frequency detecting circuit 340, a phase difference control circuit 200 is electrically connected with the frequency change circuit 33 and the receiving coil 101 and controls them so that the phase difference between the excitation voltage $V_1$ and the receiving voltage $V_2$ becomes $\pi/2$. In this circuit, the resonant frequency detecting circuit 340 is connected to the phase difference control circuit 200 in a way that it detects the frequency of the receiving voltage $V_2$ when the phase difference between the excitation voltage $V_1$ and the receiving voltage $V_2$ becomes $\pi/2$.

Figure 22:
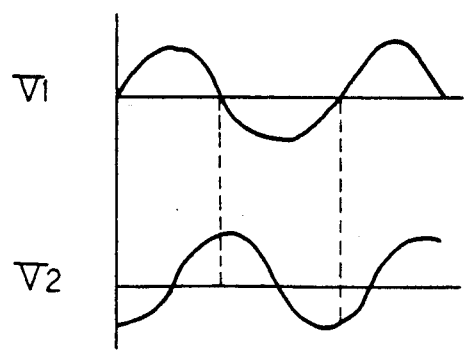
FIG. 22 is a diagram showing a relationship between the excitation voltage and the received voltage in the second embodiment according to the present invention.

The operation of the circuit shown in FIG. 20 is explained below. The first coil 13 in the first circuit C1 is excited by the electromagnetic coupling when the excitation voltage $V_2$ is applied to the excitation coil 99. Then, the receiving voltage $V_2$ is generated through the receiving coil 101. In this case, when the frequency of the excitation voltage $V_2$ is equal that of the resonant frequency of the first circuit C1, the phase difference between the excitation voltage $V_1$ and the receiving voltage $V_2$ becomes $\pi/2$ as shown in FIG. 22. According to the second embodiment, the phase difference control circuit 200 controls the phase difference between the excitation voltage $V_2$, and the receiving voltage $V_1$ so that it maintains a $\pi/2$ phase difference.

Figure 21:
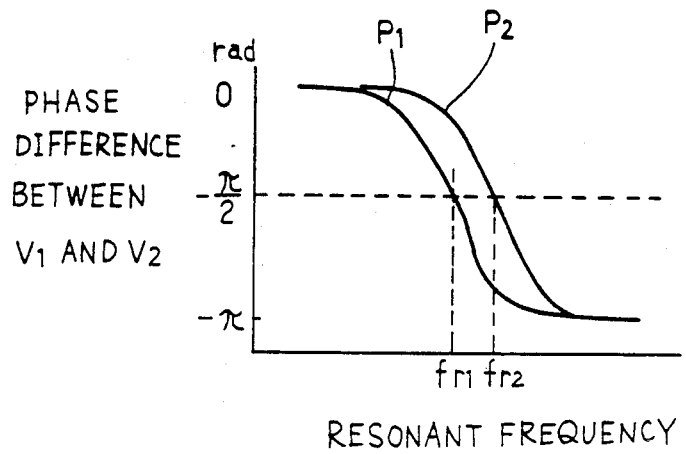
FIG. 21 is a characteristic diagram showing a relationship between the phase difference and the resonant frequency in the second embodiment according to the present invention.
Figure 23:
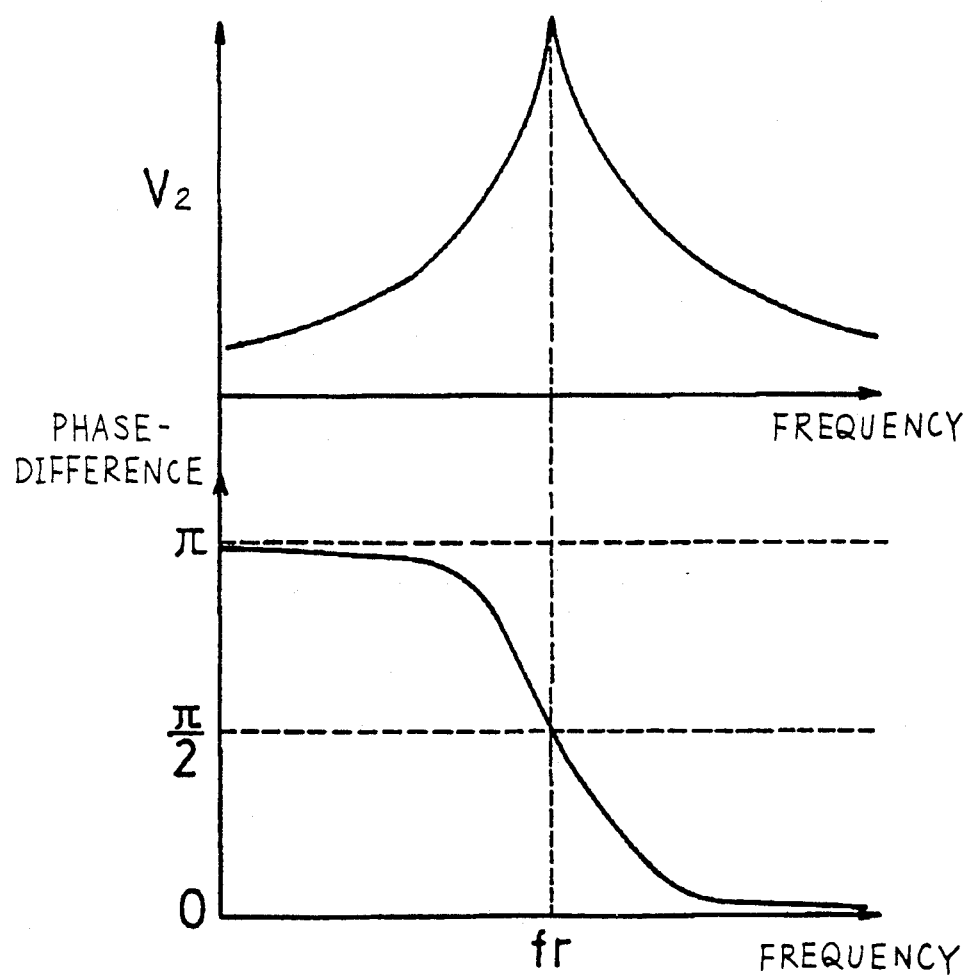
FIG. 23 is a characteristic diagram showing a relationship between the received voltage and frequency, and a relationship between the phase difference and the frequency in the second embodiment according to the present invention.
Figure 24:
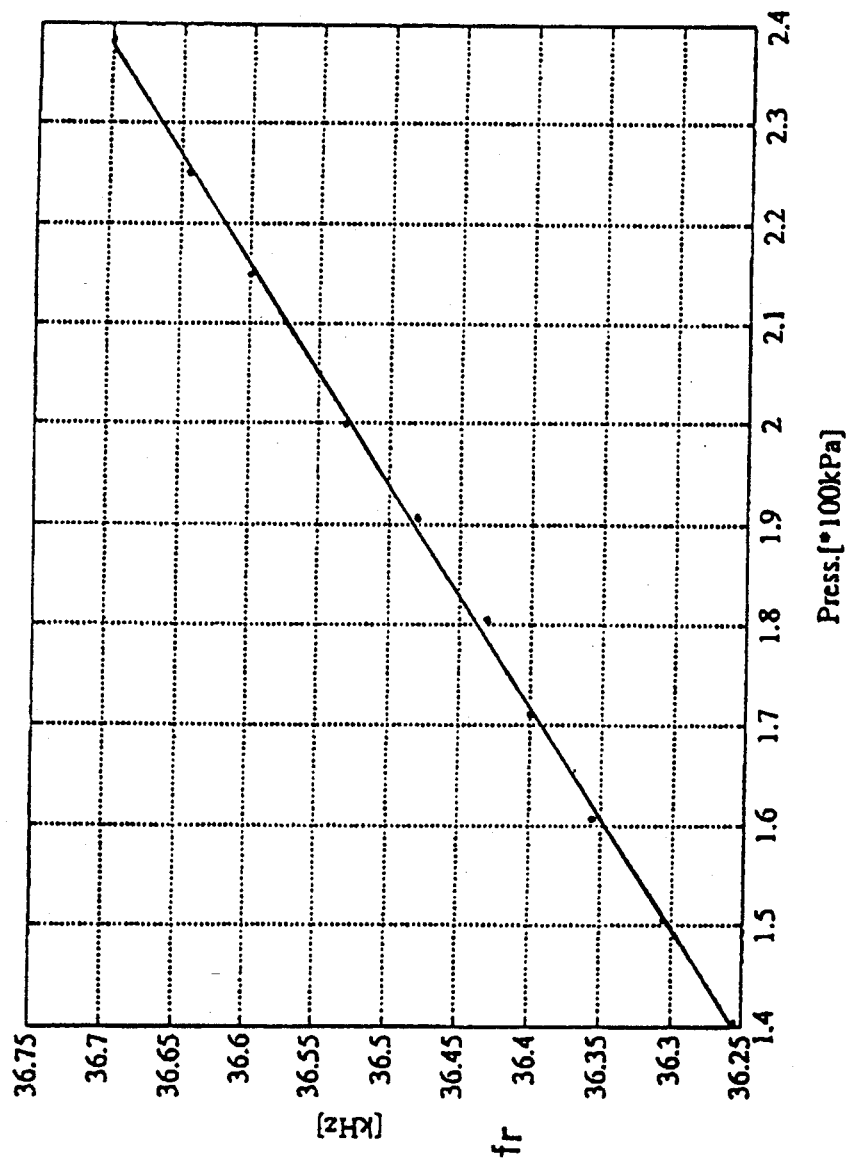
FIG. 24 is a characteristic diagram showing a relationship between air pressure and the resonant frequency in the second embodiment according to the present invention.

So, as shown in FIG. 21, the frequency of the receiving voltage $V_2$ is detected as a resonant frequency $fr_1$ or $fr_2$ by the resonant frequency detecting circuit 340 when the phase difference between the excitation voltage $V_1$ and the receiving voltage $V_2$ becomes $\pi/2$, namely when the first circuit C1 is in a resonant condition. When such a resonant condition exists, the receiving voltage $V_2$ becomes a maximum value as shown in FIG. 23. As a result, a S/N ratio of the receiving voltage $V_2$ becomes high so that the resonant frequency of the receiving voltage $V_2$ can be easily detected. Then, the tire pressure is detected based on the relationship between the resonant frequency fr of the receiving voltage $V_2$ as shown in FIG. 24. The tire pressure is proportional to the resonant frequency of the receiving voltage $V_2$. Because the resonant frequency can be detected by using the phase difference between the excitation voltage $V_1$ and the receiving voltage $V_2$, any inaccuracies which could result from the change of the receiving voltage $V_2$ by noise, can be prevented.

Figure 25:
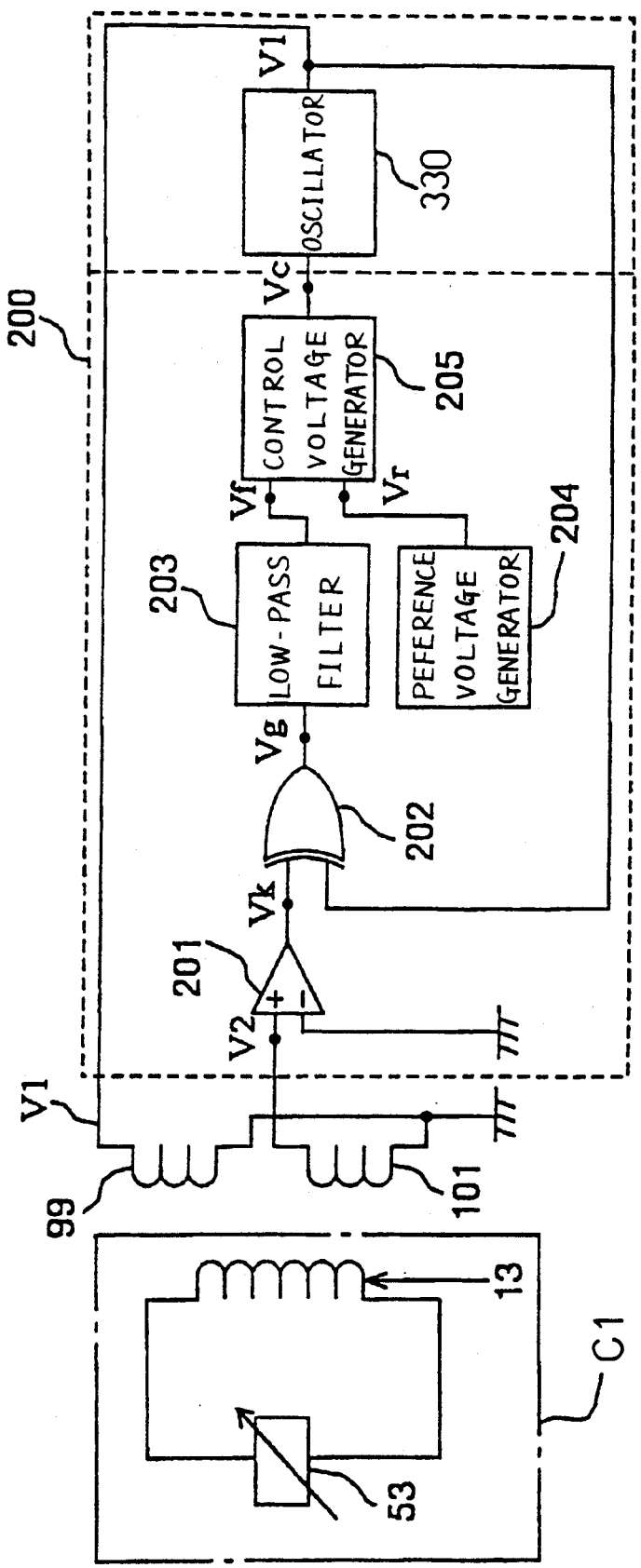
FIG. 25 is a block diagram showing a configuration of a phase difference control circuit of the second embodiment according to the present invention.
Figure 26:
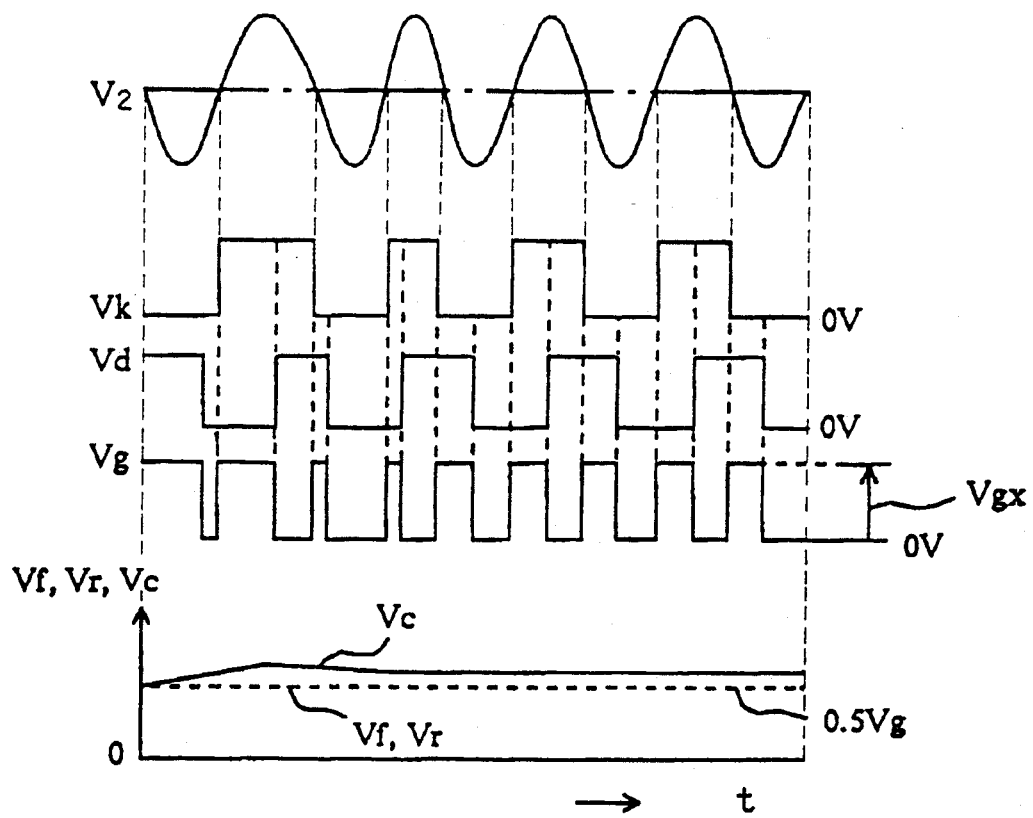
FIG. 26 is a diagram showing waveforms in various points illustrated in FIG. 25.

The detailed configuration and the operation of the phase difference control circuit 200 is explained below with reference to FIG. 25 and FIG. 26. FIG. 25 shows a voltage controlled oscillator 330, which operates as the frequency change circuit 33. VCO 330 is configured to change its frequency within a predetermined range including the resonant frequency of the first circuit C1. The excitation voltage $V_1$ from the voltage controlled oscillator 330 is supplied to the excitation coil 99 so as to excite the first coil 13 by electromagnetic coupling. On the other hand, the receiving coil 101 is connected to a comparator 201 which converts the sine-wave receiving voltage $V_2$ into a rectangular voltage $V_k$. The rectangular voltage $V_k$ is compared to the excitation voltage $V_1$ by a exclusive or gate 202.

The output voltage $V_g$ of the exclusive or gate 202 becomes low level when rectangular voltage $V_k$ is equal to the excitation voltage $V_1$. On the other hand, the output voltage $V_g$ of the exclusive-or gate 202 becomes a high level when the rectangular voltage $V_k$ is different from the excitation voltage $V_1$. The output voltage $V_g$ is integrated into a direct current voltage $V_f$ by a low-pass filter 203. The direct current voltage $V_f$ is compared to the reference voltage $V_r$, which is generated from a reference voltage generator 204. A control voltage generator 205 generates an output voltage $V_c$ which is based on the voltage difference between the direct current voltage $V_f$ and the reference voltage $V_r$ and which tends to make this difference approach zero.

In this circuit, when the phase difference between the rectangular voltage $V_k$ and the excitation voltage $V_1$ is $\pi/2$, the dutyt ratio of the output voltage $V_g$ of the exclusive-or gate 202 becomes 0.5. As a result, the direct current voltage $V_f$ becomes one half of the peak value $V_{gx}$ of the output voltage $V_g$ of the exclusive-or gate 202. Accordingly, when the reference voltage $V_r$ is one half of the output voltage $V_g$ of the exclusive-or gate 202, the oscillating frequency of the excitation voltage $V_1$ is equal to the resonant frequency of the first circuit C1 in a resonant condition.

Figure 27:
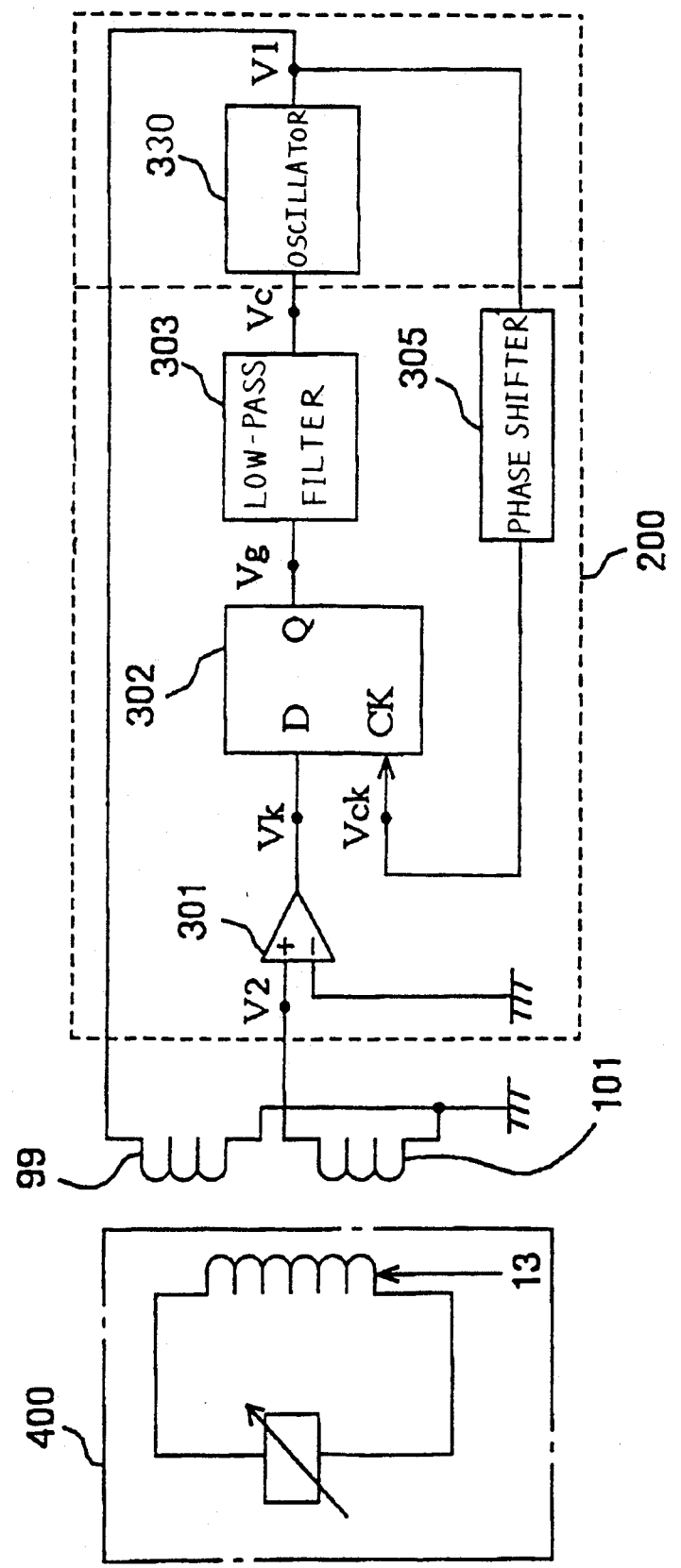
FIG. 27 is a block diagram showing a configuration of the other phase difference control circuit of the second embodiment according to the present invention.
Figure 28:
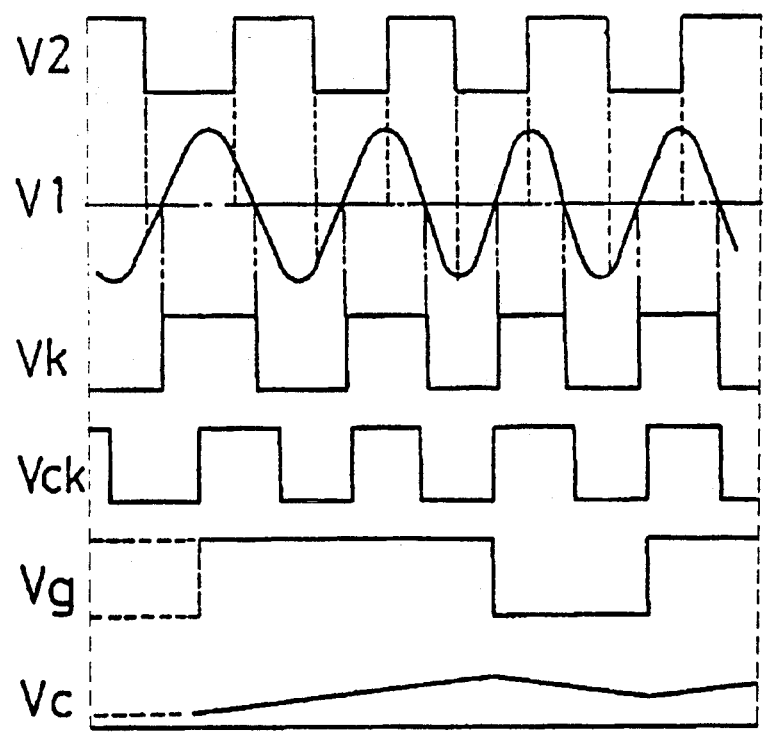
FIG. 28 is a diagram showing waveforms in various points illustrated in FIG. 27.

Another example of the phase difference circuit 200 is explained below with reference to FIG. 27 and FIG. 28. In FIG. 27, the receiving voltage $V_2$ is converted into the rectangular voltage $V_k$ in a comparator 303. The rectangular voltage $V_k$ is inputted to a input terminal D of a D flip-flop 302. A clock pulse input terminal of D flip-flop 302 is connected to a phase shifter 305 which generates the signal voltage $V_{ck}$ whose phase is different from that of the excitation voltage $V_1$ by $\pi/2$. When the phase of the rectangular voltage $V_k$ leads the signal voltage $V_{ck}$, the output voltage $V_g$ of the D flip-flop 302 is a high level.

When the phase of the signal voltage $V_{ck}$ leads the rectangular voltage $V_k$, the output voltage $V_k$ of the D flip-flop 302 is low level. The output voltage $V_g$ of the D flip-flop 302 is converted to the direct current voltage by the low-pass filter 303 and then, is inputted to the voltage control oscillator 330. As shown in FIG. 28, the oscillating frequency of the voltage control oscillator 330 increases as the output voltage $V_c$ of the low-pass filter 303 increases. In the operation of this circuit, the phase difference between the rectangular voltage $V_k$ and the signal voltage $V_k$ becomes zero. Accordingly, the phase difference between the rectangular voltage $V_k$ and the excitation voltage $V_1$ is always $\pi/2$ because the phase of the signal voltage $V_{ck}$ leads the phase of the excitation voltage V₁ by π/2. As a result, the oscillating frequency of the voltage controlled oscillator 330 is equal to the resonant frequency of the first circuit C1.

Third Embodiment

The third embodiment of the present invention is explained below with reference to FIG. 29 through FIG. 38. This third embodiment adds a temperature comparing function to the apparatus described in the second embodiment.

Figure 29:
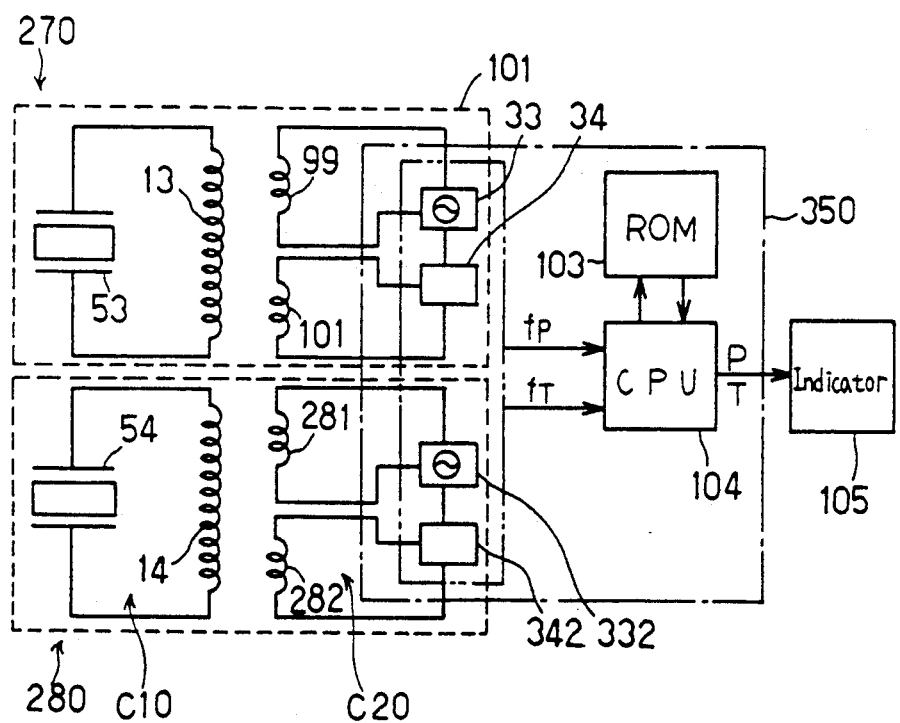
FIG. 29 is an electric diagram showing a configuration of a third embodiment according to the present invention.

FIG. 29 shows reference numeral 270 designates a pressure detecting circuit which is identical with the circuit as shown in FIG. 20. Reference numeral 280 designates a temperature detecting circuit whose configuration is similar to the pressure detecting circuit 270 but is modified to detect temperature instead of pressure. Namely, the temperature detecting circuit 280 includes a first circuit C10, which is provided in the tire of the vehicle, and a second circuit C20 which is provided in the vehicle body.

Figure 30:
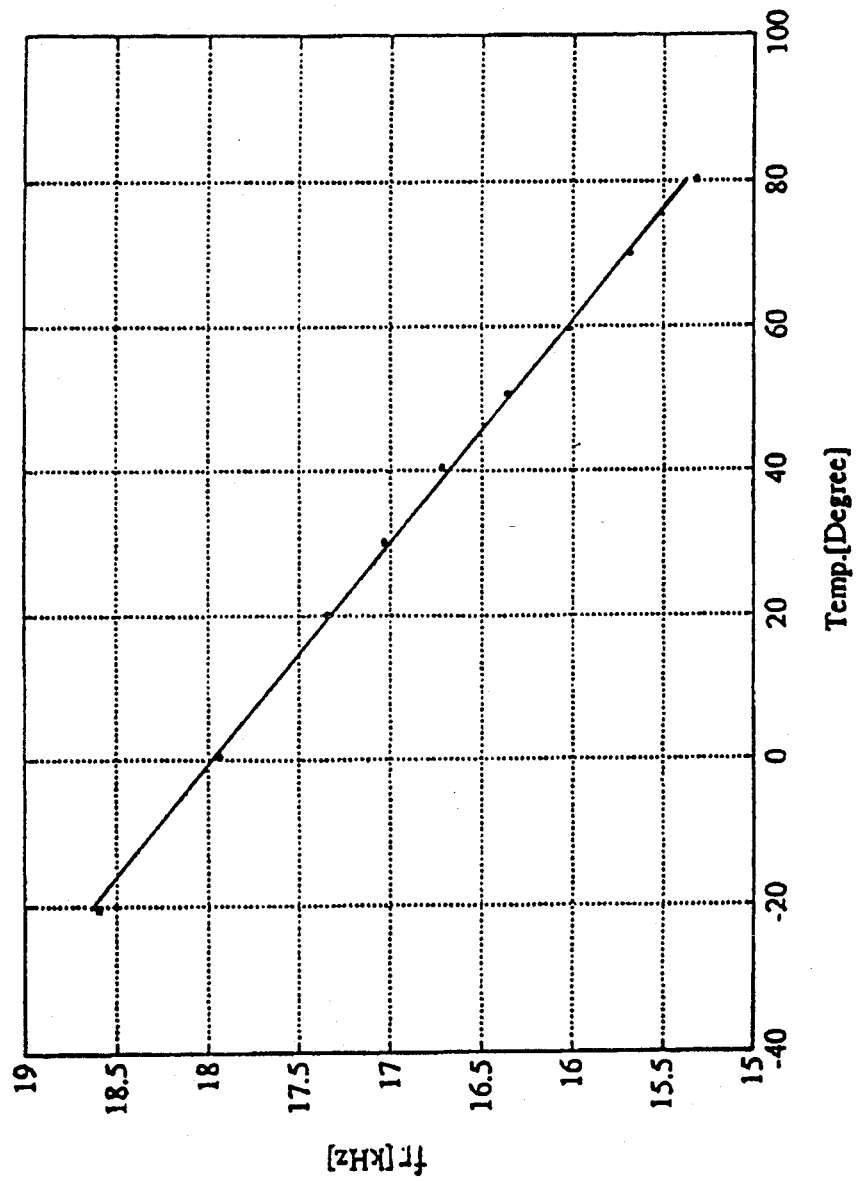
FIG. 30 is a characteristic diagram showing a relationship between a resonant frequency and temperature in a resonant circuit of the third embodiment according to the present invention.
Figure 36:
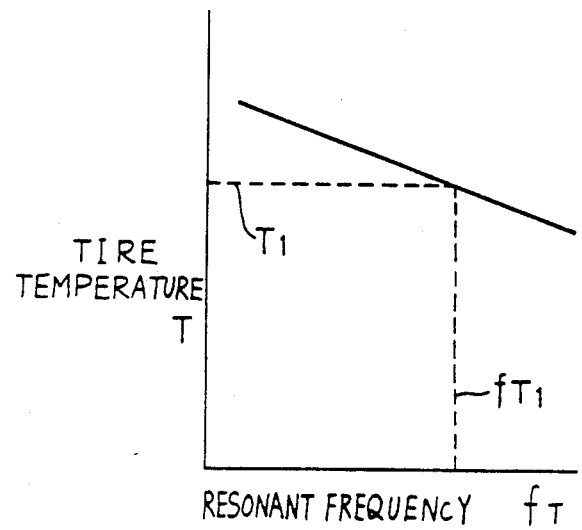
FIG. 36 is a characteristic diagram showing a relationship between a resonant frequency and a tire temperature in the third embodiment according to the present invention.
Figure 37:
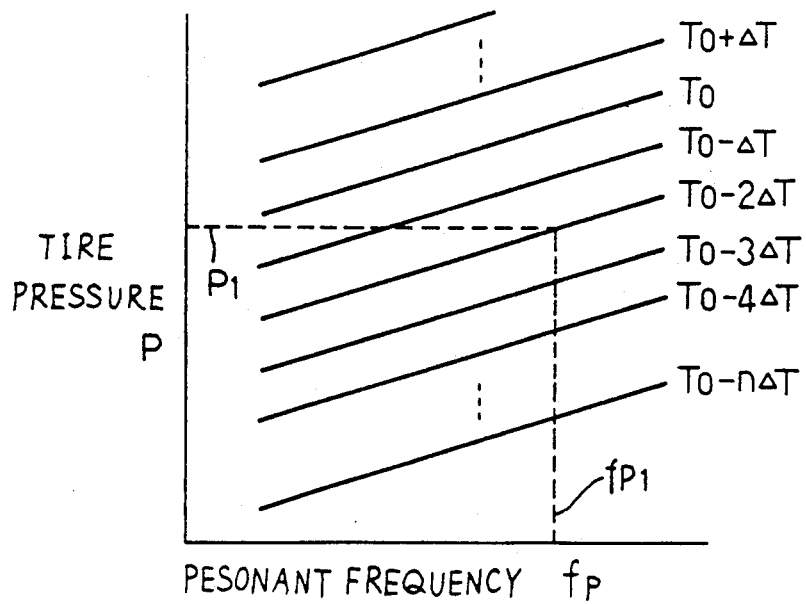
FIG. 37 is a characteristic diagram showing a relationship between a resonant frequency and a tire pressure in the third embodiment according to the present invention.

A piezoelectric element 54 of the first circuit C10 is electrically connected with a first coil 14 in order to form a resonant circuit. In this case, the piezoelectric element 54 is provided in the tire for detecting the tire temperature instead of the tire pressure. Since the capacity of the piezoelectric element 54 changes in accordance with the tire temperature, the resonant frequency of the first circuit C10 is changed in accordance with the tire temperature. A excitation coil 281 of the second circuit C20 is electrically connected with a frequency changing circuit 332 for supplying the excitation coil 281. A receiving coil 282 is electrically connected with a frequency detecting circuit 342. Both coils 281 and 282 are coupled to the resonant coil 14. The difference between the pressure detecting circuit 270 and the temperature detecting circuit 280 is that the temperature detecting circuit 280 produces the resonant frequency $f_T$ indicative of the tire temperature, while the pressure detecting circuit 270 produces the resonant frequency $f_P$ indicative of the tire pressure. The pressure detecting circuit 270 and the temperature detecting circuit 280 are electrically connected with the microcomputer 350 so that both the resonant frequency $f_T$ and the resonant frequency $f_P$ are input to the microcomputer 350 which computes the tire pressure and the tire temperature therefrom. A ROM 103 within the microcomputer 350 stores a first data map, which indicates a relationship between the resonant frequency $f_T$ and the tire temperature, and a second data map, which indicates a relationship between the resonant frequency $f_P$ and the tire pressure. The first data map is stored in advance by measuring the various tire temperature and the corresponding resonant frequency $f_T$ within a predetermined temperature range such as −30° C. through 140° C. as shown in FIG. 36. The measuring results are indicated in FIG. 30 in which the resonant frequency $f_T$ decreases in proportion to the tire temperature. The second data map is previously made by measuring the tire pressure and the corresponding resonant frequency $f_P$ at various temperatures which cover a minimum temperature $T_0 - n \cdot \Delta T$ through a maximum temperature $T_0 + n \cdot \Delta T$ (wherein n is a integral number) within a predetermined pressure and temperature range as shown in FIG. 37. In this case, the deviation value $\Delta T$ is 1° C. for instance. The microcomputer 350 is electrically connected to an indicator 105 for indicating the tire pressure and the tire temperature to the driver of the vehicle.

Figure 31:
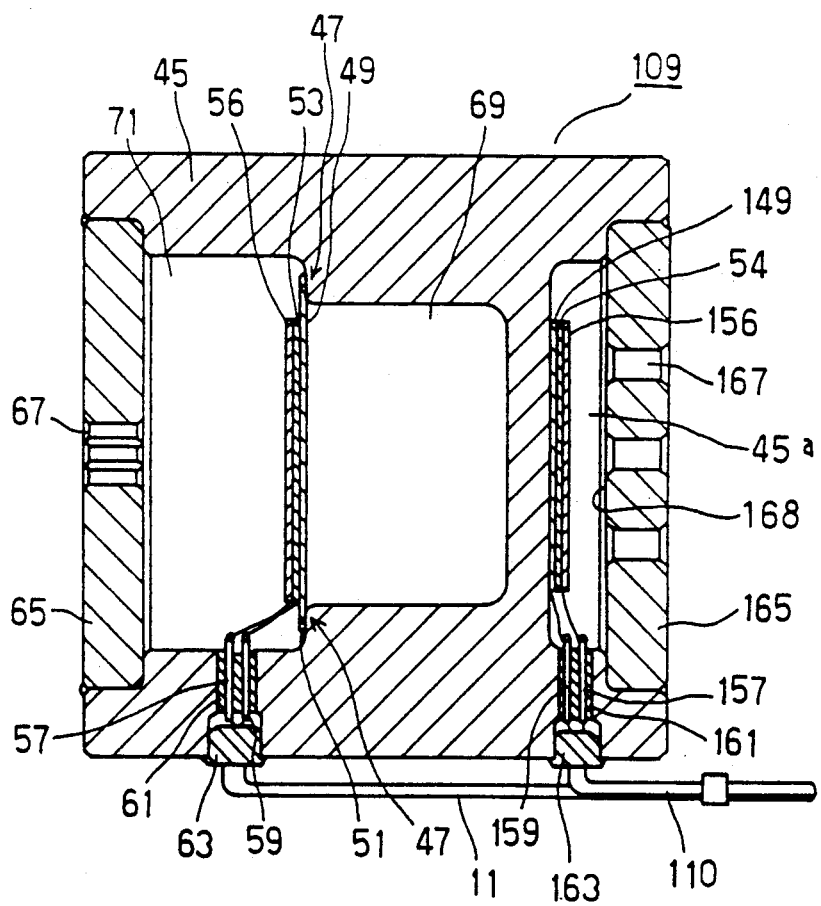
FIG. 31 is a detail sectional view of the pressure detecting portion in the third embodiment according to the present invention.

Installation structure for each element of the above described circuits are explained below with reference to FIG. 31 through FIG. 33. FIG. 31 uses the same reference numerals as those used in FIG. 5 to designate the same structures shown in FIG. 5. The third embodiment has a pressure detecting portion 109 which includes a structure for installing the piezoelectric element 54 for detecting the tire temperature. Hollow portion 45a is formed within the housing 45. A diaphragm 149 is fixed to the inside wall of the hollow portion 45a together with the piezoelectric element 54 and an electrode 156. The hollow portion 45a is covered with a cap 165 through which plural holes 167 are provided for introducing the air into the tire. These holes 167 are sealed with the sealing board 168 so that the air is not introduced into the hollow portion 45a. The sealing board 45a is made of a high heat-conductivity material. Both electrode 156 and the piezoelectric element 54 are electrically connected to wires 157 and 159, respectively. Both wires 157 and 159 and an insulating member 161 are electrically connected to the wire 110. The insulating member 161 is fixed to the housing 45 with a rubber seal member 163. The pressure detecting portion is installed in the rim 3 of the tire in a similar manner to that illustrated in FIG. 1 through FIG. 3.

Figure 32:
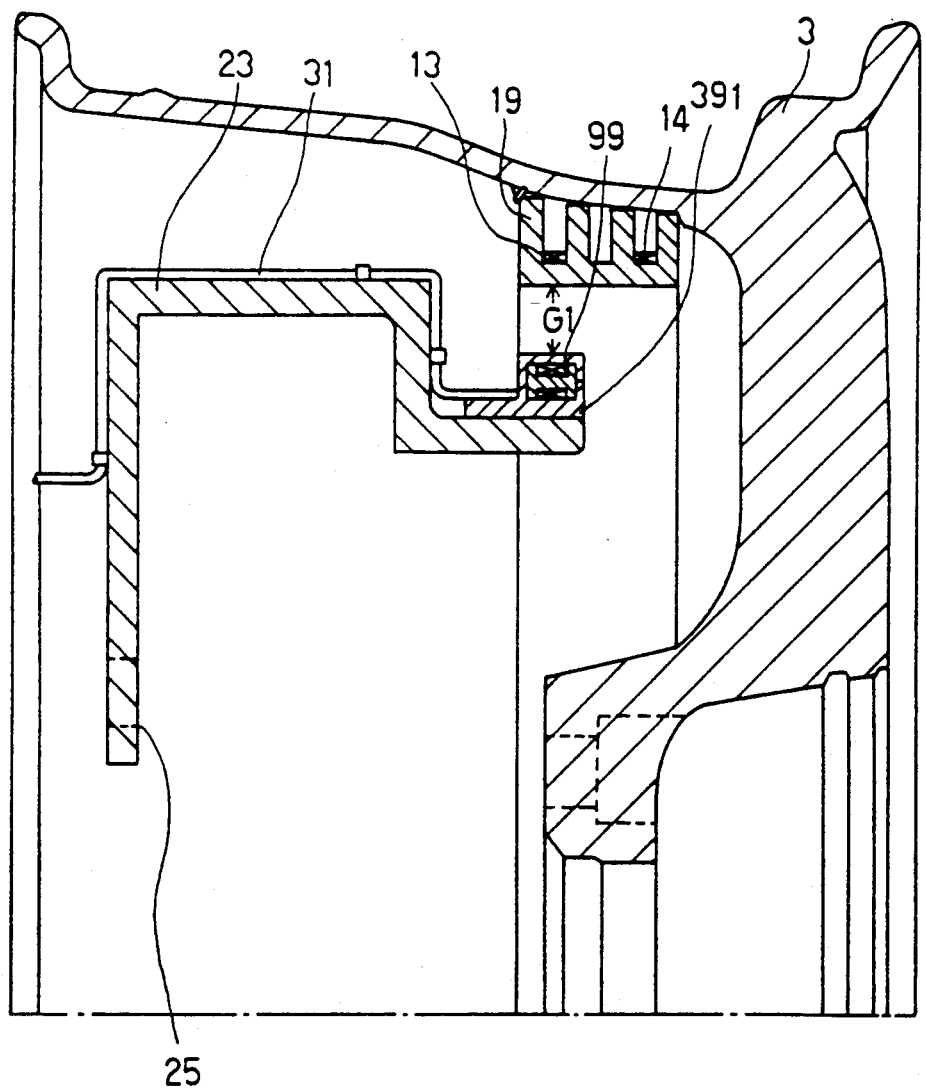
FIG. 32 is a sectional view of a wheel to which the third embodiment are applied.
Figure 33:
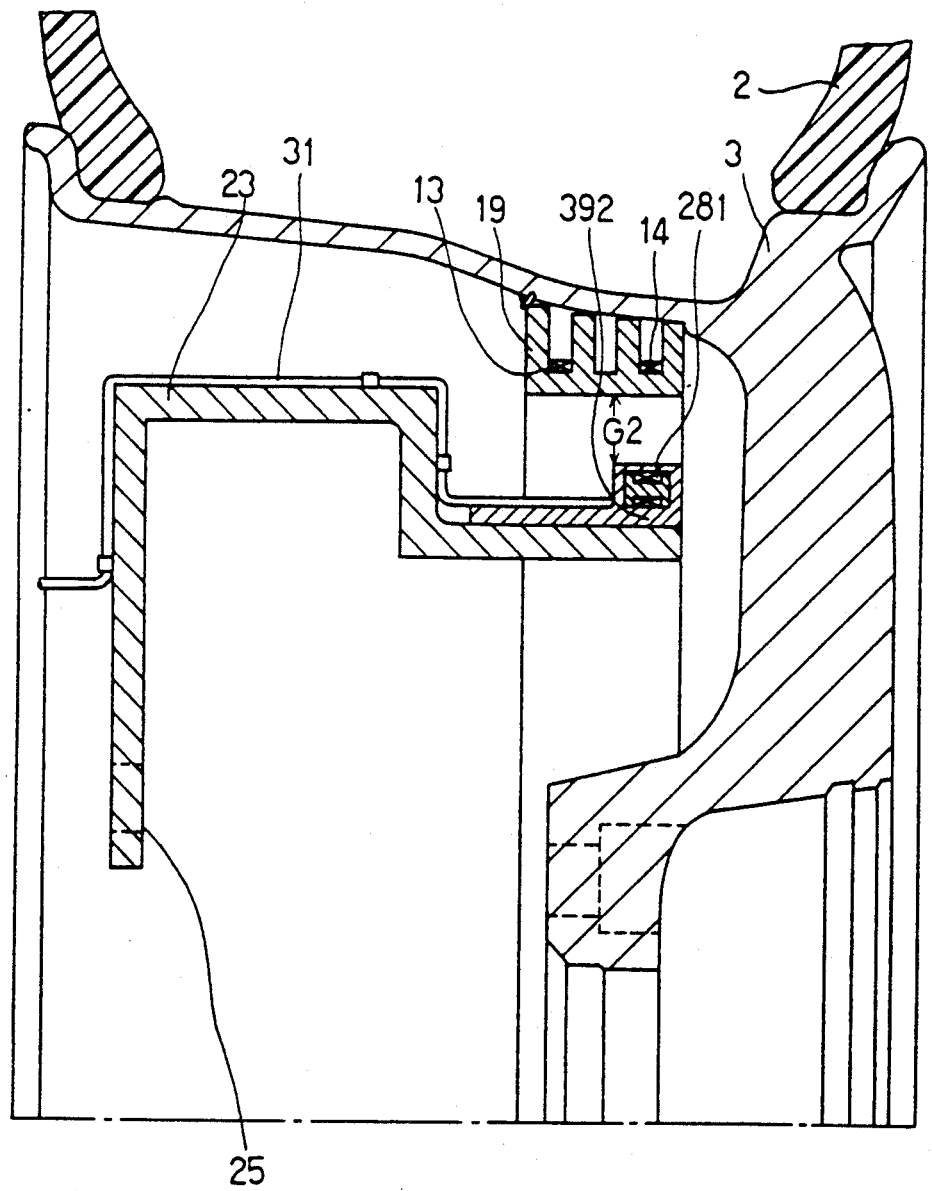
FIG. 33 is a sectional view of a wheel to which the third embodiment are applied.

FIG. 32 and FIG. 33 show cylindrical bobbin 19 of ABS resin whose entire outer circumferential surface is adhered to the inner surface of the rim 3. The first coil 13 of the pressure detecting circuit 270, and the first coil 14 of the temperature detecting circuit 280 are separately wound on the outer surface of the bobbin 19. FIG. 32 shows a resin case 391 for setting the excitation coil 99 and the receiving coil 101 installed by a stay 31 inside the bobbin 19 so that the case 391 faces one portion of the bobbin 19, on which the coil 13 is wound, with a gap G1 of 6-10 mm. In this installation, the position of the excitation coil 99 is shifted from the position of the receiving coil 101 by 90° in order to prevent the magnetic coupling between the excitation coil 99 and the receiving coil 101. Independent of the resin case 391, the other resin case 392 for setting the excitation coil 281 and the receiving coil 282 is installed by a stay 31 inside the bobbin 19 so that the case 392 faces the other portion of the bobbin 19, on which the coil 14 is wound, with a 6-10 mm gap as shown in FIG. 33. In this installation, the position of the excitation coil 281 is shifted from the position of the receiving coil 282 by 90° for preventing the magnetic coupling between the excitation coil 281 and the receiving coil 282.

Figure 34A:
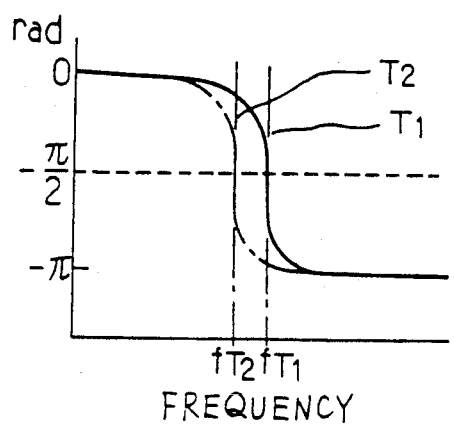
FIG. 34(a) is a characteristic diagram showing a relationship between a frequency and a phase difference in a temperature detecting circuit in the third embodiment according to the present invention.
Figure 35A:
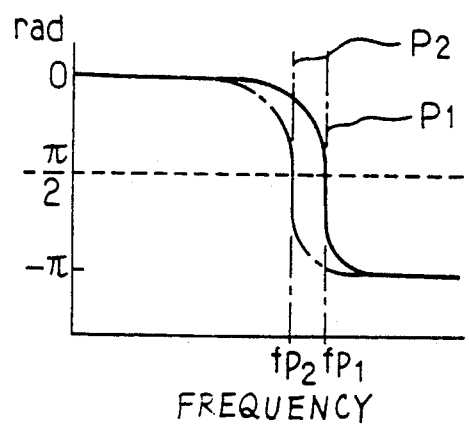
FIG. 35(a) is a characteristic diagram showing a relationship between a frequency and a phase difference in a pressure detecting circuit in the third embodiment according to the present invention.
Figure 34B:
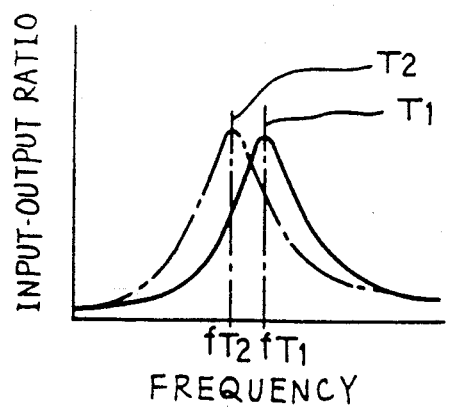
FIG. 34(b) is a characteristic diagram showing a relationship between a frequency and an input-output ratio of the receiving voltage to the excitation voltage in a temperature detecting circuit in the third embodiment according to the present invention.
Figure 35B:
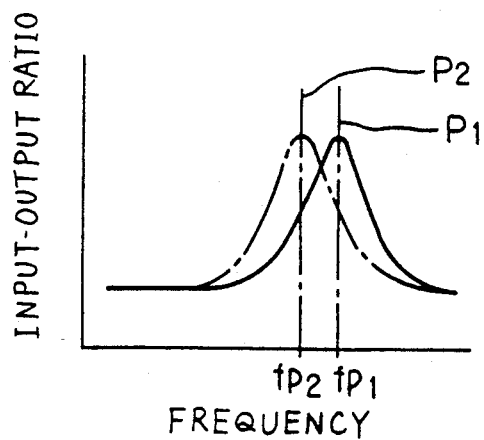
FIG. 35(b) is a characteristic diagram showing a relationship between a frequency and an input-output ratio of the receiving voltage to the excitation voltage in a pressure detecting circuit in the third embodiment according to the present invention.

The operation of the third embodiment of the present invention is explained with reference to FIG. 34(a) through FIG. 39. At first, operation characteristics of the pressure detecting circuit 270 and the temperature detecting circuit 280 are explained by using FIG. 34(a) through 35(b). In FIG. 34(a) and FIG. 34(b), when the tire temperature is T1, the corresponding resonant frequency $f_T$ of the temperature detecting 280 becomes $f_{T1}$ at which the phase difference between the excitation voltage and the receiving voltage becomes π/2. Then, when the tire temperature becomes T2, the resonant frequency $f_T$ of the temperature detecting circuit 280 is shifted to $f_{T2}$. In FIG. 35(a) and FIG. 35(b), when the tire pressure is P1, the corresponding resonant frequency $f_P$ of the pressure detecting 270 becomes $f_{P1}$ at which the phase difference between the excitation voltage and the receiving voltage becomes π/2. Then, when the tire pressure becomes P2, the resonant frequency $f_P$ of the pressure detecting circuit 280 is shifted to $f_{P2}$. Accordingly, the resonant frequencies $f_P$ to $f_T$ are detected by controlling the phase difference between the excitation voltage and the receiving voltage in each circuit so that such phase difference becomes $\pi/2$, as explained in the second embodiment of the present invention.

Figure 38:
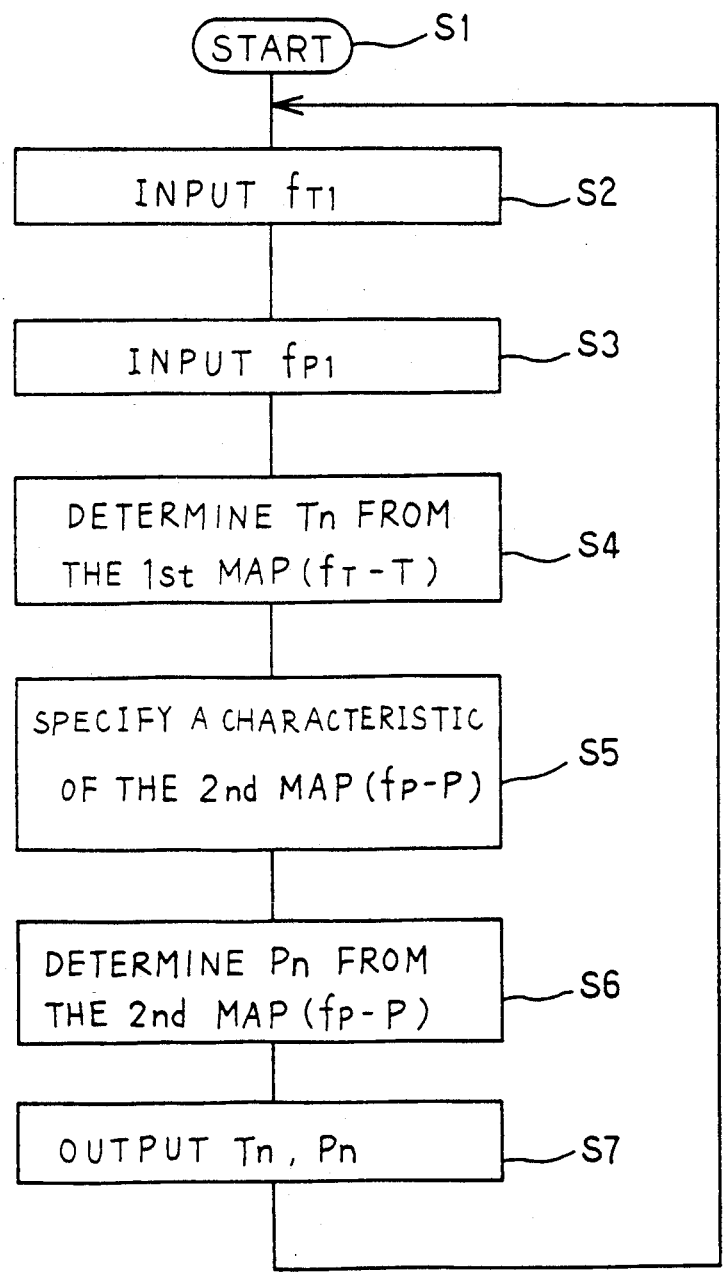
FIG. 38 is a flow chart showing a program carried out by electronic control unit in the third embodiment according to the present invention.

An operation of the microcomputer 350 is explained below with reference to FIG. 38. In a first step S1, the resonant frequency $f_{Tn}$ is inputted from the temperature detecting circuit 280. Then, the resonant frequency $f_{Pn}$ is inputted from the pressure detecting circuit 270 in a step S3. The program proceeds to a step S4, where a temperature is determined from the first data map shown in FIG. 36 which is stored in ROM 103, on the basis of the inputted resonant frequency $f_{Tn}$. Then, one characteristic between the tire pressure and the resonant frequency at the tire temperature Tn is specified in the second data map illustrated in FIG. 37 by using the obtained temperature Tn in a step S5. Then, a pressure Pn is determined from the specified characteristic in the second data map in a step S6. In a step S7, the determined tire temperature Tn and the tire pressure Pn are outputted from the microcomputer 350 to the indicator 105. Then, the program returns to the step S2 and repeats the above explained operation in response to the inputted resonant frequency $f_{Tn}$ and $f_{Pn}$.

Fourth Embodiment

Figure 39:
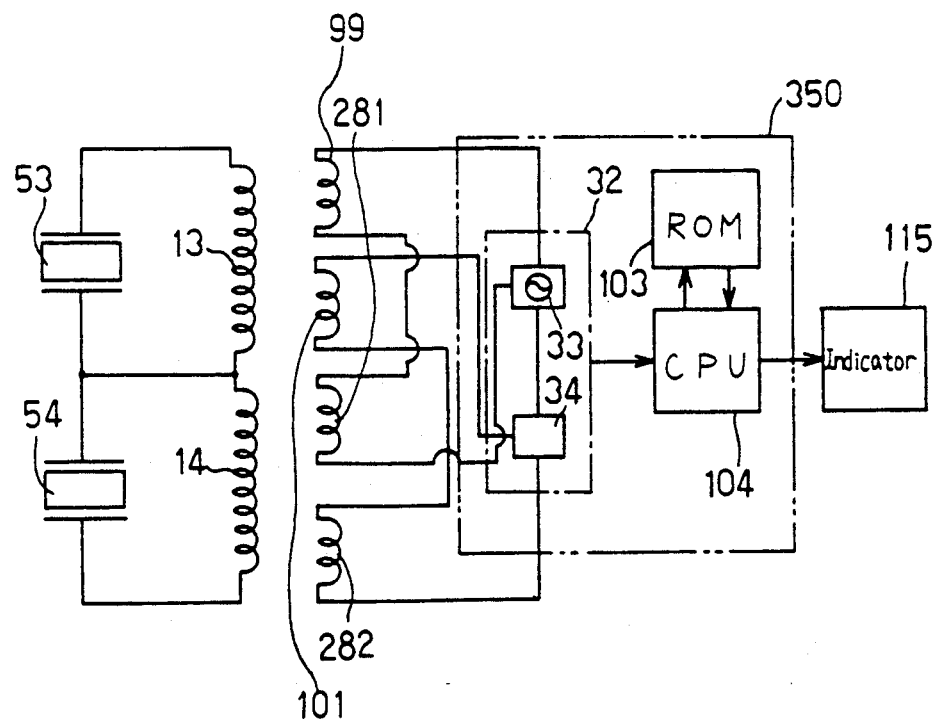
FIG. 39 is a diagram showing a electric configuration of a fourth embodiment according to the present invention.

A fourth embodiment of the present invention is explained below with reference to FIG. 39 through FIG. 41(b). According to the fourth embodiment, one frequency changing circuit 33 and one frequency detecting circuit 34 are commonly used in both the tire pressure detecting circuit and the temperature detecting circuit as shown in FIG. 39. Namely, both of the excitation coils 99 and 281 are electrically connected with the frequency changing circuit 33, and both receiving coils 101 and 282 are electrically connected with the frequency detecting circuit 34. In this case, it is necessary that the resonant frequency $f_T$ indicative of the tire temperature be different from the resonant frequency $f_P$ indicative of the tire pressure during the operation because the frequency changing circuit 33 and the frequency detecting circuit 34 are used for detecting both resonant frequencies $f_T$ and $f_P$. For this purpose, the inductance of the first coil 13 differs from that of the first coil 14 (or the capacitance of the piezoelectric element 53 differs from that of the piezoelectric element 54). The frequency changing circuit 33 shifts its changing range from one range for the temperature detection to the other range for the pressure detection at a predetermined interval.

Figure 40:
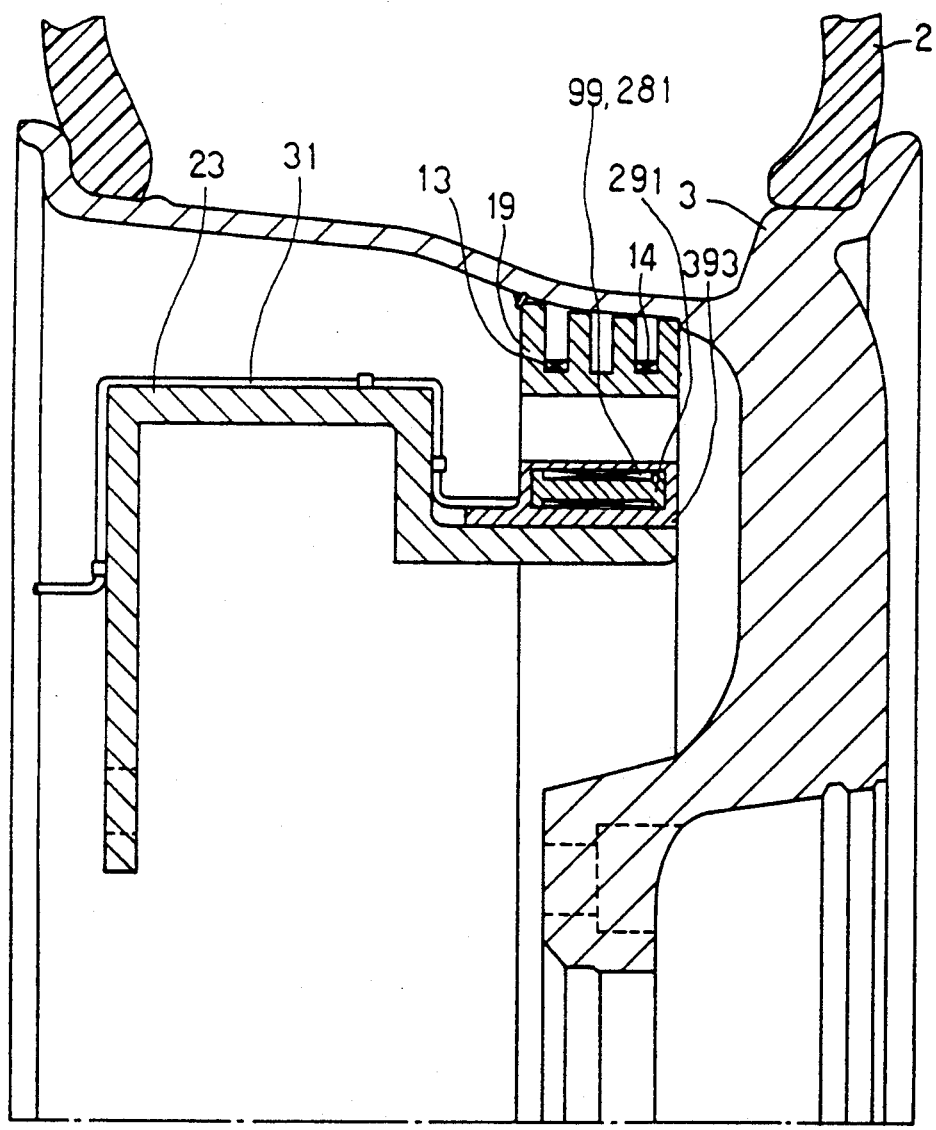
FIG. 40 is a sectional view of a wheel to which the fourth embodiment are applied.

FIG. 40 shows the first coils 13 and 14 wound on the bobbin 19 in a same manner described in the third embodiment. Both the excitation coils 99 and 281 are integrally wound on a iron core 291 which is disposed in a resin case 393. The resin case 393 is installed in the vehicle by the stay 23 so that both the excitation coils 99 and 281 are electromagnetically coupled with the first coils 13 and 14.

The gap between the bobbin 19 and the resin case 392 is between 6 mm and 10 mm. Both receiving coils 101 and 282 are installed in the vehicle body in the same manner. However, the position of the receiving coils 101 and 282 are shifted from the position of the excitation coils 99 and 281 by 90° to the wheel shaft for preventing magnetic coupling between the excitation coils 99 and 281 and the receiving coils 101 and 282.

Figure 41A:
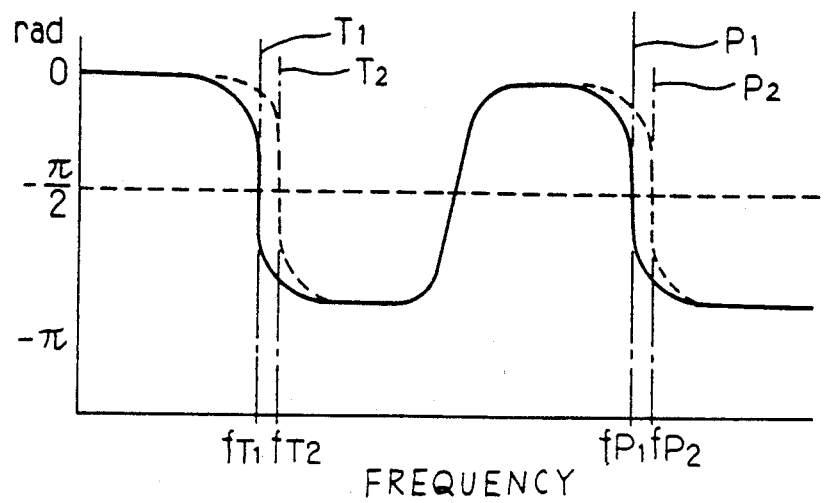
FIG. 41(a) is a characteristic diagram showing a relationship between a frequency and a phase difference in the fourth embodiment according to the present invention.
Figure 41B:
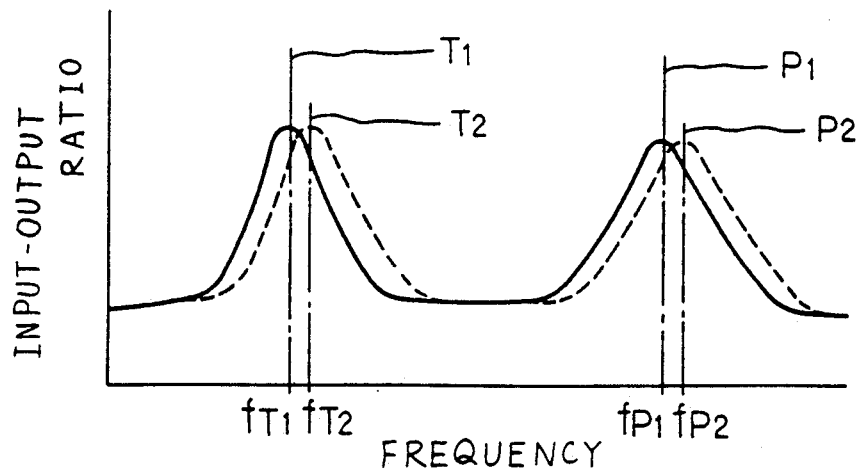
FIG. 41(b) is a characteristic diagram showing a relationship between a frequency and an input-output ratio the receiving voltage to the excitation voltage in the fourth embodiment according to the present invention.

An operation of the fourth embodiment of the present invention is explained below with reference to FIG. 41(a) and FIG. 41(b). In FIG. 41(a) and FIG. 41(b), when the tire temperature T1, the corresponding resonant frequency $f_T$ of the temperature detecting becomes $f_{T1}$ at which the phase difference between the excitation voltage and the receiving voltage becomes $\pi/2$. Then, when the tire temperature becomes T2, the resonant frequency $f_T$ of the temperature detecting circuit is to shifted $f_{T2}$. In the meantime, when the tire pressure is P1, the corresponding resonant frequency $f_P$ of the pressure detecting becomes $f_{P1}$ at which the phase difference between the excitation voltage and the receiving voltage becomes $\pi/2$. Then, when the tire pressure becomes P2, the resonant frequency $f_P$ of the pressure detecting circuit is shifted to $f_{P2}$. Accordingly, the resonant frequencies $f_P$ and $f_T$ are detected by controlling the phase difference between the excitation voltage and the receiving voltage in each circuit so that such phase difference becomes $\pi/2$, as explained in the second embodiment of the present invention. Thereafter, the tire temperature and the tire pressure are computed by the microcomputer 350 as explained in the above third embodiment.

Fifth Embodiment

A fifth embodiment of the present invention is explained below with reference to FIG. 42 through FIG. 48.

Figure 42:
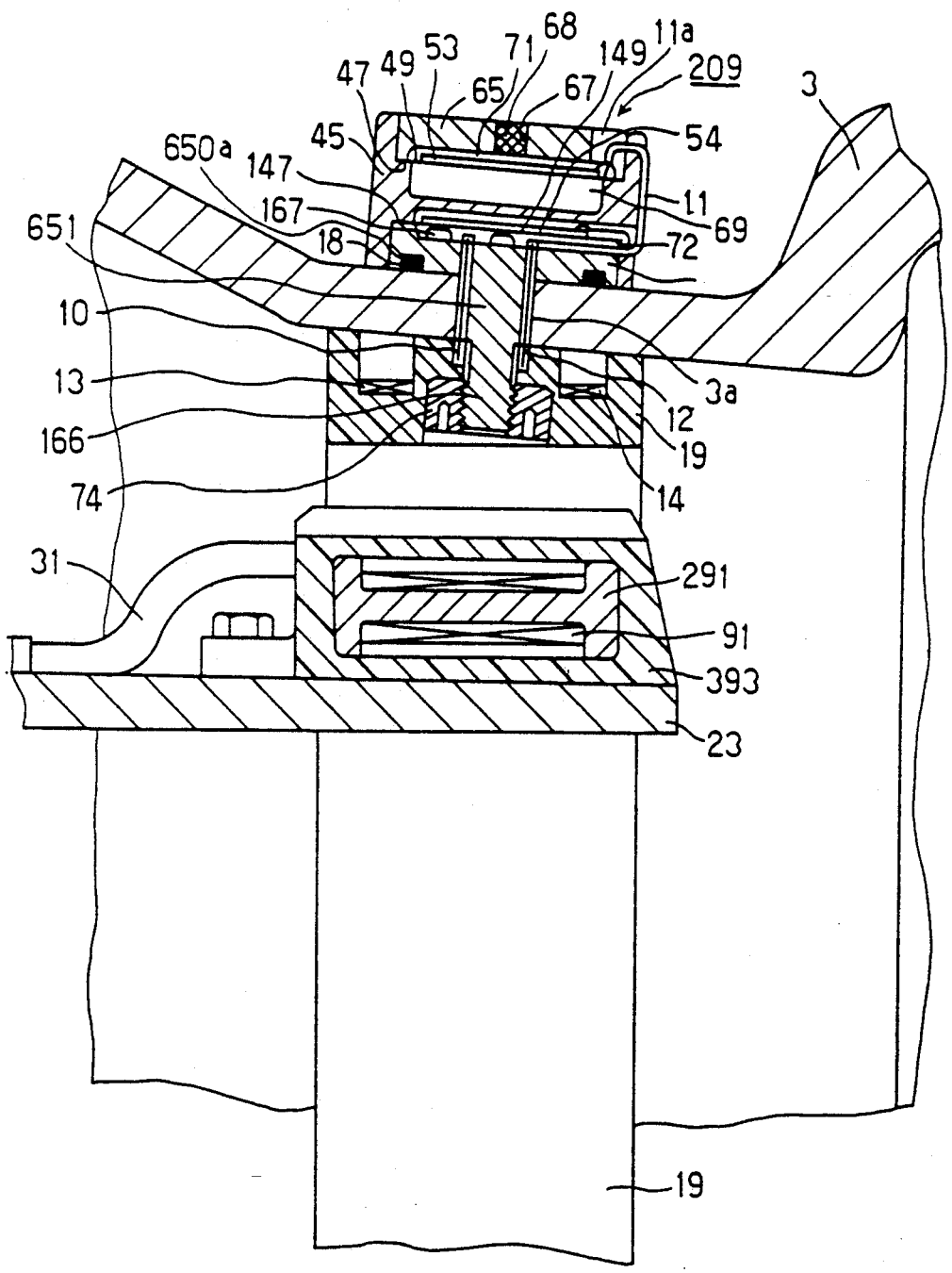
FIG. 42 is a sectional view of a pressure detecting portion in a fifth embodiment according to the present invention.

According to the fifth embodiment, the piezoelectric elements 43 and 54 are horizontally disposed in the tire as shown in FIG. 42 for the purpose of increasing the detecting area thereof. Namely, the pressure detecting portion 209 is fixed to the rim 3 so that the cap 65, the piezoelectric elements 53 and 54 and the cap 650 are substantially parallel to the rim 3.

Figure 43:
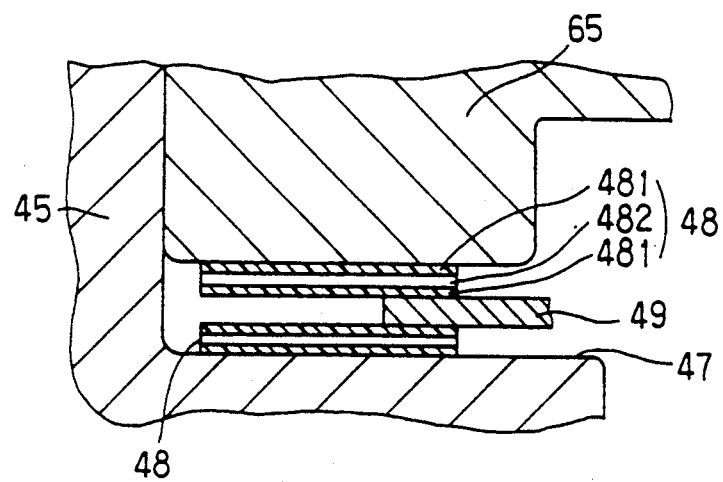
FIG. 43 is a sectional view of an enlarged portion shown in FIG. 42.
Figure 47:
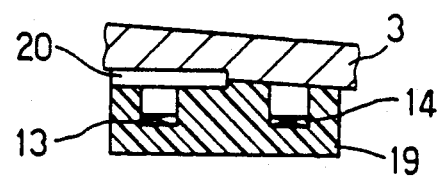
FIG. 47 is a sectional view showing a fixing structure of a bobbin used in the fifth embodiment according to the present invention.
Figure 45:
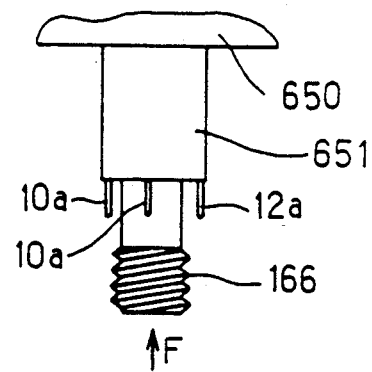
FIG. 45 is a plan view showing a positive part of a connecting portion in the fifth embodiment according to the present invention.
Figure 46:
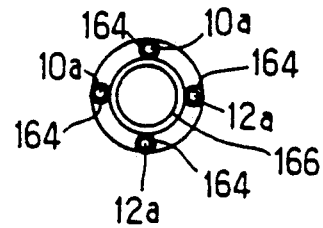
FIG. 46 is a plan view from the direction F illustrated in FIG. 47.

The detailed structure of the pressure detecting portion 209 is explained below. FIG. 42 shows a metal filter 68 which is made of sintered porous metal and disposed within the pressure introducing holes 67 for preventing any sudden pressure change from being transferred to the diaphragm 47. The end portion of the diaphragm 49 is sandwiched with rubber sheets 481 and soft metal sheets 482 between the cap 65 and the step portion 47 as shown in FIG. 43 in order to seal the low pressure chamber 69. The other structure of the pressure detecting portion 209 is the same as that of the pressure detecting portion 109 of the third embodiment illustrated in FIG. 31 except the cap 650. The cap 650 has a bolt portion 651 which is integrally formed therewith. A screw portion 166 is formed on the end of the bolt portion 651. The bolt portion 651 is inserted in a through hole 3a of the rim 3 and a through hole 19a of the bobbin 19. Then, the screw portion 166 is coupled with a nut 74. According to this coupling structure, the pressure detecting portion 209 is fixed to the rim 3 together with the bobbin 19. Further, the bobbin 19 is firmly fixed by driving pins 20 between the rim 3 and the bobbin 19 as shown in FIG. 47. In this case, the inside of the tire is sealed with an O-ring 18 which is provided in a circular groove 650a of the cap 650. In FIG. 45 and FIG. 46, reference numeral 10a designate connecting pins which are electrically connected through a connecting line 10 and 11 with the piezoelectric element 53, and reference numeral 12a designates connecting line 12 with the piezoelectric element 54.

Figure 44:
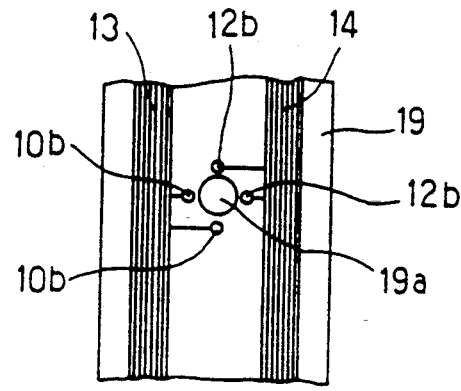
FIG. 44 is a plan view showing a negative part of a connecting portion in the fifth embodiment according to the present invention.

The connecting lines 10 and 12 are provided through the cap 650 and the bolt portion 651. In FIG. 46, reference numeral 164 denotes a pin insulating member. In FIG. 44, reference numerals 10b and 12b designate connecting holes in which the connecting pins 10a and 12a are respectively inserted so that the connecting pins 10a and 12a are electrically connecting holes 10b and 12b, respectively. The connecting holes 10b and 12b are electrically connected with the first coils 13 and 14, respectively.

Figure 48:
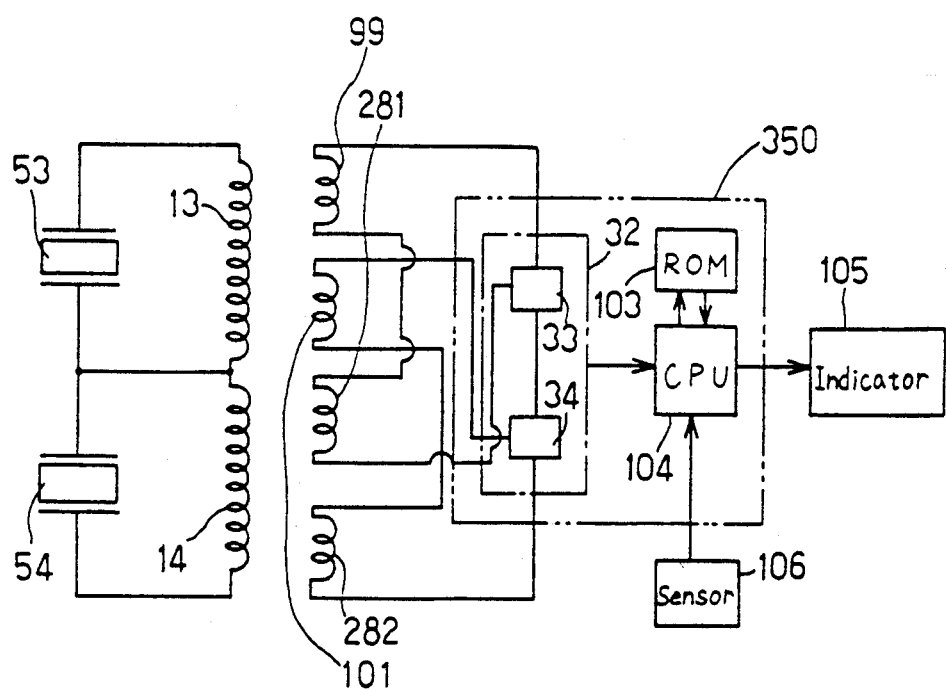
FIG. 48 is a diagram showing a electric configuration of a fifth embodiment according to the present invention.

According to the fifth embodiment, the piezoelectric elements 53 and 54 are influenced by centrifugal force of the rotating tire, because the piezoelectric elements 53 and 54 are horizontally disposed in the tire as shown in FIG. 42 so that their pressure detecting surface receives the centrifugal force from a rotation of the tire. However, this effect is compensated, as shown in FIG. 48, by the CPU 104 of the microcomputer 350. CPU 104 computes the centrifugal force based on the wheel rotation speed signal from a wheel rotation speed sensor 106 using standard physics. The force on the pressure detecting surface can be determined, and this force is used to compensate the obtained tire pressure which is computed in accordance with the change of the capacitance of the piezoelectric elements 53.

Sixth Embodiment

Figure 49:
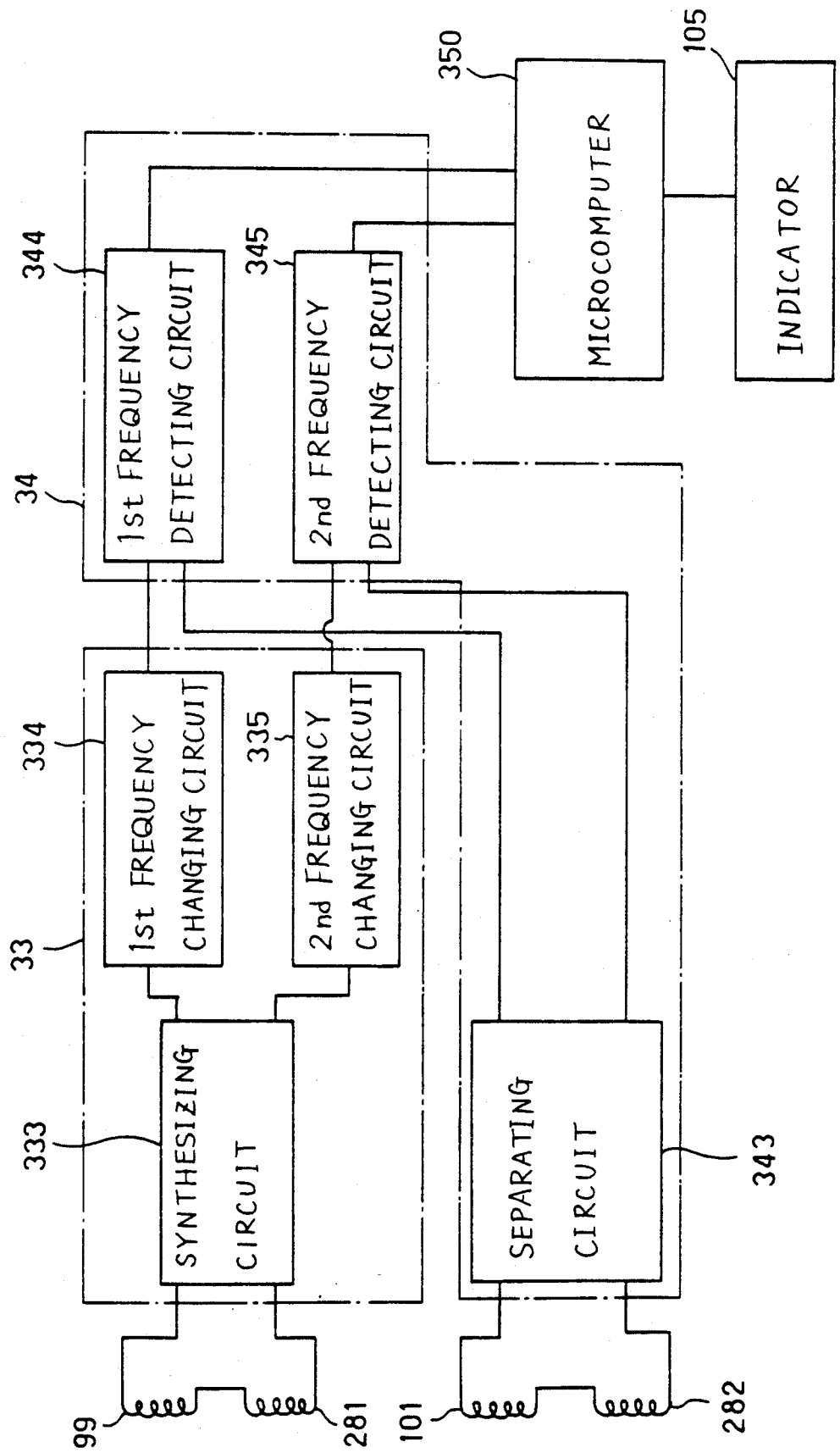
FIG. 49 is a diagram showing a electric configuration of a sixth embodiment according to the present invention.
Figure 50:
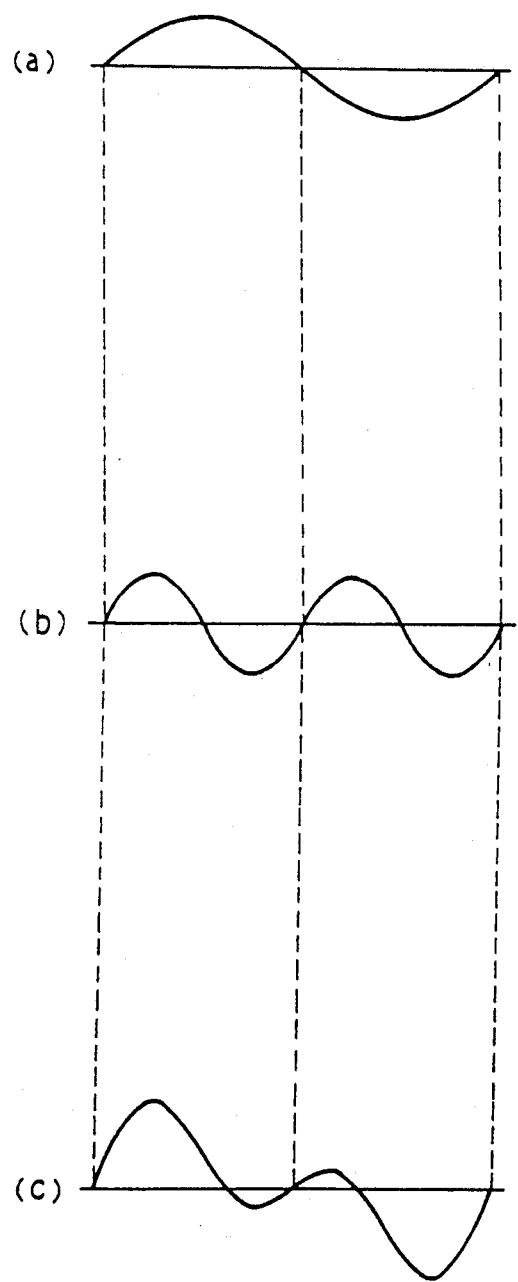
FIG. 50 is a diagram showing waveforms in the sixth embodiment according to the present invention.
Figure 51:
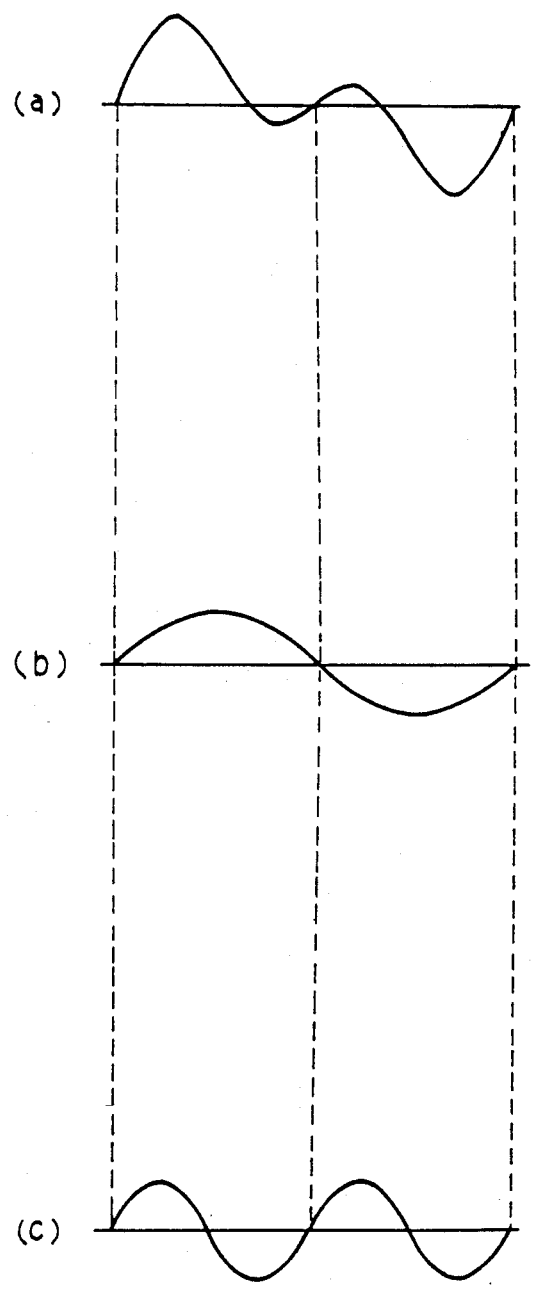
FIG. 51 is a diagram showing waveforms in the sixth embodiment according to the present invention.

A sixth embodiment of the present invention is explained below with reference to FIG. 49 through FIG. 51. According to the sixth embodiment, the frequency changing circuit 33 includes a first frequency changing circuit 334, which changes the frequency for detecting the tire pressure, and a second frequency changing circuit 335 which changes the frequency for detecting the tire temperature. The first frequency changing circuit 334 outputs an alternating voltage whose waveform is shown in FIG. 50(a). The frequency changing circuit 335 outputs the alternating voltage whose waveform is shown in FIG. 50(B). Both frequency changing circuits 334 and 335 are electrically connected with synthesizing circuit 333 in which the excitation voltage shown in FIG. 50(c) is synthesized based on the alternating voltage outputted from the frequency changing circuits 334 and 335. The synthesized excitation voltage is applied to the excitation coils 99 and 281. On the other hand, the frequency detecting circuit 34 includes a separating circuit 343 which separates a receiving voltage shown in FIG. 51(a) into the two different voltages having different frequencies. One separated voltage shown in FIG. 50(b) is inputted in a first frequency detecting circuit 344. The other separated voltage shown in FIG. 50(c) is inputted in a first frequency detecting circuit 345. The first frequency detecting circuit 344 detects the resonant frequency indicative of the tire pressure when the phase difference between the alternating voltages shown in FIG. 50(a) and the separated voltage shown in FIG. 51(b) becomes $\pi/2$. The second frequency detecting circuit 345 detects the resonant frequency indicative of the tire temperature when the phase difference between the alternating voltage shown in FIG. 50(b) and the separated voltage shown in FIG. 51(c) becomes $\pi/2$. The detected resonant frequencies are inputted in the microcomputer 350 which determines the corresponding tire pressure and tire temperature based on the detected resonant frequencies. The detected tire pressure and the tire temperature are indicated by the indicator as described in the above fourth and fifth embodiments.

Seventh Embodiment

Figure 52:
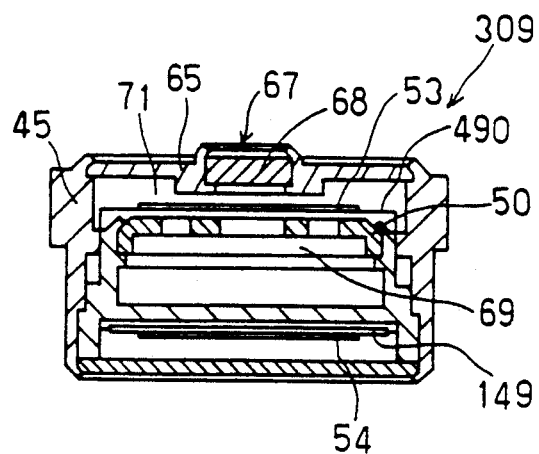
FIG. 52 is a sectional view showing one condition of a pressure detecting portion in the sixth embodiment according to the present invention.
Figure 53:
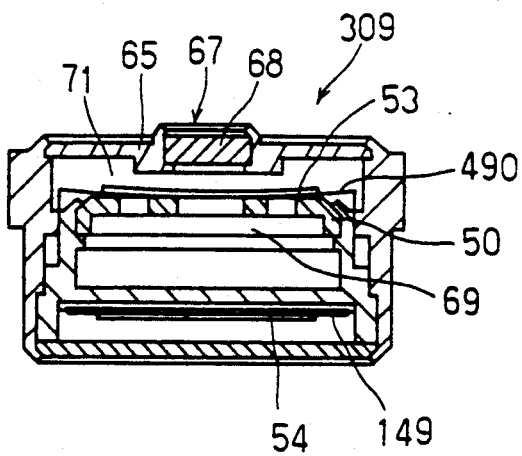
FIG. 53 is a sectional view showing the other condition of a pressure detecting portion in the sixth embodiment according to the present invention.

A seventh embodiment of the present invention is explained below with reference to FIG. 52 and FIG. 53. This embodiment relates to another example of the pressure detecting portion 309. In FIG. 52, a cylindrical diaphragm is welded to the inner wall of the housing 45. For the purpose of preventing excess deviation of the diaphragm 490, a stopper 50 is disposed within the low pressure chamber 69. Therefore, even when the tire pressure increases suddenly or when the tire pressure exceeds the standard value, deviation of the diaphragm 490 is stopped by the stopper 50 as shown in FIG. 53 so that its excess deviation is prevented. Other elements and structure of the pressure detecting portion 309 are the same as those shown in FIG. 42.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A tire pressure detecting apparatus for detecting a tire pressure of a tire of a vehicle, comprising:

pressure-impedance transforming means, provided within said tire, for transforming a change in tire pressure into a change of capacitance indicative of said change in pressure, said pressure-impedance transforming means including:

a housing which is provided within said tire;

a first chamber provided within said housing, a pressure of said first chamber being maintained at a predetermined value;

a second chamber provided within said housing including means for introducing said tire pressure into said second chamber; and a piezoelectric element provided within said housing so as to be deformed by a pressure difference between the predetermined pressure of said first chamber and the tire pressure of said second chamber, whereby a capacitance of said piezoelectric element is changed in accordance with its deformation;

resonant signal producing means, electrically connected with said pressure-impedance transforming means within said tire, for producing a resonant electric signal having a resonant frequency in accordance with the capacitance change generated from said pressure-impedance transforming means;

voltage supplying means, provided in said vehicle, for supplying said resonant signal producing means with an alternating voltage whose frequency is changed within a predetermined range including said resonant frequency;

resonant signal receiving means, provided in said vehicle, for receiving said resonant electric signal produced from said resonant signal producing means; and pressure detecting means, provided in said vehicle, for detecting the tire pressure based on said received resonant electric signal.

2. A tire pressure detecting apparatus according to claim 1, wherein said pressure-impedance transforming means further includes:

a diaphragm provided between said first chamber and second chamber so as to be deformed by a pressure difference between the predetermined pressure of said first chamber and the tire pressure of said second chamber; and wherein said piezoelectric element is provided on said diaphragm so as to be deformed by said deformation of said diaphragm, whereby an impedance of said piezoelectric element is changed in accordance with its deformation to cause said impedance change.

3. A tire pressure detecting apparatus according to claim 1, wherein said resonant signal producing means is electromagnetically coupled with said voltage supplying means and resonant signal means.

4. A tire pressure detecting apparatus according to claim 1, wherein said pressure detecting means includes:
resonant frequency determining means for determining that said received resonant electric signal has said resonant frequency; and
tire pressure determining means for determining a corresponding tire pressure by using a determination result of said resonant frequency determining means and a data map which stores a relationship between said resonant frequency and said tire pressure.

5. A tire pressure detecting apparatus according to claim 4, wherein said resonant frequency determining means determines that said received resonant electric signal has said resonant frequency when an electric current of said received resonant electric signal becomes less than a predetermined value.

6. A tire pressure detecting apparatus for detecting a tire pressure of a tire of a vehicle, comprising:
pressure-impedance transforming means, provided within said tire, for transforming a change in tire pressure into a change of capacitance indicative of said change in pressure;
resonant signal producing means, electrically connected with said pressure-impedance transforming means within said tire, for producing a resonant electric signal having a resonant frequency in accordance with the capacitance change generated from said pressure-impedance transforming means;
voltage supplying means, provided in said vehicle, for supplying said resonant signal producing means with an alternating voltage whose frequency is changed within a predetermined range including said resonant frequency;
resonant signal receiving means, provided in said vehicle, for receiving said resonant electric signal produced from said resonant signal producing means; and
pressure detecting means, provided in said vehicle, for detecting the tire pressure based on said received resonant electric signal,
said pressure detecting means including:
resonant frequency determining means for determining that said received resonant electric signal has said resonant frequency; and
tire pressure determining means for determining a corresponding tire pressure by using a determination result of said resonant frequency determining means and a data map which stores a relationship between said resonant frequency and said tire pressure; and
wherein said resonant frequency determining means determines that said received resonant electric signal has said resonant frequency when a phase difference between said alternating voltage and said received resonant electric signal becomes $\pi/2$.

7. A tire pressure detecting apparatus for detecting a tire pressure of a tire of a vehicle, comprising:
a housing provided within said tire;
a first chamber provided within said housing, a pressure of said first chamber being maintained at a predetermined value;
a second chamber, provided within said housing, including means for introducing the tire pressure into said second chamber;
a piezoelectric element provided within said housing so as to be deformed by a pressure difference between the predetermined pressure in said first chamber and the tire pressure in said second chamber, whereby an impedance of said piezoelectric element is changed in accordance with its deformation;
a first coil electrically connected with said piezoelectric element within said tire;
an excitation coil, provided in the vehicle, which is electromagnetically coupled with said first coil, for exciting said first coil with an excitation voltage whose frequency is changed within a predetermined range including a resonant frequency;
a receiving coil, provided in the vehicle, which is electromagnetically coupled with said first coil for receiving an induced voltage from said first coil;
resonant frequency determining means for determining that said induced voltage has said resonant frequency; and
tire pressure determining means for determining a corresponding tire pressure by using a determination result of said resonant frequency determining means and a data map storing a relationship between said resonant frequency and said tire pressure.

8. An apparatus as in claim 7 wherein said impedance change is primarily a capacitance change.

9. A tire pressure detecting apparatus according to claim 7, wherein said resonant frequency determining means determines that said induced voltage has said resonant frequency when an electric current, generated by said induced voltage, becomes minimal.

10. A tire pressure detecting apparatus according to claim 7, wherein said resonant frequency determining means determines that said induced voltage has said resonant frequency when a phase difference between an alternating voltage and said induced voltage becomes $\pi/2$.

11. A tire pressure detecting apparatus for detecting a tire pressure of a tire of a vehicle, comprising:
first transforming means, provided within said tire, for transforming a change in tire pressure into a capacitance change;
second transforming means, provided within said tire, for transforming a tire temperature into a capacitance change;
first resonant signal producing means, electrically connected with said first transforming means within said tire, for producing a first resonant electric signal having a first resonant frequency in accordance with the capacitance change generated from said first transforming means;
second resonant signal producing means, electrically connected with said second transforming means within said tire, for producing a second resonant electric signal having a second resonant frequency in accordance with the capacitance change generated from said second transforming means;

first voltage supplying means, provided in said vehicle, for supplying said first resonant signal producing means with a first alternating voltage having at least said first resonant frequency;

second voltage supplying means, provided in said vehicle, for supplying said second resonant signal producing means with a second alternating voltage having at least said second resonant frequency;

first resonant signal receiving means, provided in said vehicle, for receiving said first resonant electric signal produced from said first resonant signal producing means;

second resonant signal receiving means, provided in said vehicle, for receiving said second resonant electric signal produced from said second resonant signal producing means;

pressure detecting means, provided in said vehicle, for detecting the tire pressure based on said first received resonant electric signal;

temperature detecting means, provided in said vehicle, for detecting the tire temperature based on said second received resonant electric signal; and compensating means for compensating said tire pressure detecting by said pressure detecting means, based on said tire temperature.

12. A tire pressure detecting apparatus according to claim 11, wherein said
first transforming means includes a piezoelectric element.

13. A tire pressure detecting apparatus according to claim 11, wherein said
second transforming means includes a piezoelectric element.

14. A tire pressure detecting apparatus according to claim 11, wherein said first resonant signal producing means is electromagnetically coupled with said first voltage supplying means and first resonant signal receiving means.

15. A tire pressure detecting apparatus according to claim 11, wherein said second resonant signal producing means is electromagnetically coupled with said second voltage supplying means and second resonant signal receiving means.

16. A tire pressure detecting apparatus according to claim 11, wherein said pressure detecting means includes:

resonant frequency determining means for determining that said first received resonant electric signal has said first resonant frequency;

tire pressure determining means for detecting a corresponding tire pressure by using the determination result of said first resonant frequency determine means and a data map storing a relationship between said first resonant frequency and said tire pressure.

17. A tire pressure apparatus according to claim 16, wherein said compensating means comprises means for specifying in said data map one characteristic between said first resonant frequency and said tire pressure based on said tire temperature.

18. A tire pressure detecting apparatus according to claim 11, wherein said temperature detecting means includes resonant frequency determining means for determining that said second received resonant electric signal has said second resonant frequency; and tire temperature determining means for determining the corresponding tire temperature by using the determination result of said second resonant frequency determining means and a data map storing a relationship between said second resonant frequency and said tire temperature.

19. A tire pressure detecting apparatus according to claim 11, further comprising indication means for separately indicating said detected tire pressure and said detected tire temperature.

20. A tire pressure detecting apparatus for detecting a tire pressure of a tire of a vehicle, comprising:

first transforming means, provided within said tire, for transforming a pressure change of said tire into a capacitance change;

second transforming means, provided within said tire, for transforming a tire temperature into a capacitance change;

first resonant signal producing means, electrically connected with said first transforming means within said tire, for producing a first resonant electric signal having a first resonant frequency in accordance with the capacitance change generated from said first transforming means;

second resonant signal producing means, electrically connected with said second transforming means within said tire, for producing a second resonant electric signal having a second resonant frequency in accordance with the capacitance change generated from said second transforming means;

voltage supplying means, provided in said vehicle, for supplying said first resonant signal producing means with a first alternating voltage having at least said first and second resonant frequencies;

first resonant signal receiving means, provided in said vehicle, for receiving said first resonant electric signal produced from said first resonant signal producing means;

second resonant signal receiving means, provided in said vehicle, for receiving said second resonant electric signal produced from said second resonant signal producing means;

pressure detecting means, provided in said vehicle, for detecting the tire pressure based on said first received resonant electric signal;

temperature detecting means, provided in said vehicle, for detecting the tire temperature based on said second received resonant electric signal; and compensating means for compensating said tire pressure detecting by said pressure detecting means, based on said tire temperature.

21. A tire pressure detecting apparatus according to claim 20, wherein said first and second transforming means each include a piezoelectric element.

22. A tire pressure detecting apparatus according to claim 20, wherein said first resonant signal producing means is electromagnetically coupled with said voltage supplying means and first resonant signal receiving means.

23. A tire pressure detecting apparatus according to claim 20, wherein said second resonant signal producing means is electromagnetically coupled with said voltage supplying means and second resonant signal receiving means.

24. A tire pressure detecting apparatus according to claim 20, wherein said pressure detecting means includes:

resonant frequency determining means for determining that said first received resonant electric signal has said first resonant frequency;

tire pressure determining means for determine a corresponding tire pressure by using the determination result of said first resonant frequency determination means and a data map storing the relationship between said first resonant frequency and said tire pressure.

25. A tire pressure detecting apparatus according to claim 24, wherein said compensating means comprises means for specifying in said data map one characteristic between said first resonant frequency and said tire pressure based on said tire temperature.

26. A tire pressure detecting apparatus according to claim 20, wherein said temperature detecting means includes resonant frequency determining means for determining that said second received resonant electric signal has said second resonant frequency;

tire temperature determining means for determining the corresponding tire temperature by using the determination result of said second resonant frequency determining means and a data map storing the relationship between said second resonant frequency and said tire temperature.

27. A tire pressure detecting apparatus according to claim 26, wherein said pressure detecting means includes:

resonant frequency determining means for determining that said first received resonant electric signal has said first resonant frequency;

tire pressure determining means for determine a corresponding tire pressure by using the determination result of said first resonant frequency determination means and a data map storing the relationship between said first resonant frequency and said tire pressure.

28. A tire pressure detecting apparatus according to claim 20, further comprising indication means for separately indicating said detected tire pressure and said detected tire temperature.

* * * * *